(12) United States Patent
Moniri et al.

(10) Patent No.: US 10,943,400 B2
(45) Date of Patent: Mar. 9, 2021

(54) MULTIMODAL USER INTERFACE FOR A VEHICLE

(71) Applicant: Cerence Operating Company, Burlington, MA (US)

(72) Inventors: Mohammad Mehdi Moniri, Düsseldorf (DE); Nils Lenke, Rheinbach (DE)

(73) Assignee: Cerence Operating Company, Burlington, MA (US)

( * ) Notice: Subject to any disclaimer, the term of this patent is extended or adjusted under 35 U.S.C. 154(b) by 0 days.

(21) Appl. No.: 16/241,767

(22) Filed: Jan. 7, 2019

(65) Prior Publication Data

US 2020/0219320 A1 Jul. 9, 2020

(51) Int. Cl.
*G06T 19/00* (2011.01)
*G10L 15/22* (2006.01)
*G06F 3/01* (2006.01)

(52) U.S. Cl.
CPC ............ *G06T 19/006* (2013.01); *G06F 3/013* (2013.01); *G06F 3/017* (2013.01); *G10L 15/22* (2013.01); *G10L 2015/223* (2013.01)

(58) Field of Classification Search
None
See application file for complete search history.

(56) References Cited

U.S. PATENT DOCUMENTS

| | | | | |
|---|---|---|---|---|
| 9,990,921 B2* | 6/2018 | VanBlon | .................. | G06F 3/013 |
| 10,242,457 B1* | 3/2019 | Sibley | ...................... | G06T 7/73 |
| 10,395,653 B2* | 8/2019 | Ikeno | .................... | G06F 3/0304 |
| 2012/0224060 A1* | 9/2012 | Gurevich | .................. | B60R 1/00 348/148 |
| 2012/0282906 A1* | 11/2012 | Frye | ........................ | H04W 4/40 455/414.2 |
| 2014/0063060 A1* | 3/2014 | Maciocci | ................ | G06F 3/011 345/633 |
| 2015/0062168 A1* | 3/2015 | Ng-Thow-Hing | ..... | G02B 27/01 345/633 |
| 2015/0178990 A1* | 6/2015 | Ng-Thow-Hing | ...... | G06F 3/147 715/850 |

* cited by examiner

*Primary Examiner* — Ryan M Gray

(74) *Attorney, Agent, or Firm* — Occhiuti & Rohlicek LLP

(57) ABSTRACT

Some embodiments described herein relate to a multimodal user interface for use in an automobile. The multimodal user interface may display information on a windshield of the automobile, such as by projecting information on the windshield, and may accept input from a user via multiple modalities, which may include a speech interface as well as other interfaces. The other interfaces may include interfaces allowing a user to provide geometric input by indicating an angle. In some embodiments, a user may define a task to be performed using multiple different input modalities. For example, the user may provide via the speech interface speech input describing a task that the user is requesting be performed, and may provide via one or more other interfaces geometric parameters regarding the task. The multimodal user interface may determine the task and the geometric parameters from the inputs.

20 Claims, 13 Drawing Sheets

MULTIMODAL USER INTERFACE FOR A VEHICLE

BACKGROUND

1. Technical Field

Some embodiments described herein relate to a multimodal user interface that accepts input via multiple modalities. In some embodiments, the multimodal user interface may be an interface for an automobile, such as a user interface that allows a user to display information on a windshield of the automobile and/or interact with information displayed on a windshield of the automobile. In some embodiments, the multimodal user interface may receive input via one input modality (e.g., speech) describing a task to be performed and also receive input of one or more parameters for the task via one or more other modalities. In a case that such parameters are geometric parameters, such as directional parameters, the input may be received from a modality that detects an angle indicated by a user, such as from an angle in which a user is pointing and/or an angle in which a user is looking.

2. Discussion of Related Art

Information may be displayed to drivers and passengers of an automobile via one or more user interfaces of the automobile. For example, gauges indicating information about a state of the automobile, such as information on a speed or the automobile, an amount of remaining fuel, or engine status may be displayed on one or more gauges on a dashboard of the automobile. As another example, information on an automobile's climate control may be displayed via an interface, or information on an audio system of the automobile may be displayed via an interface. In automobiles that include a navigation system, navigation information may be displayed via an interface.

SUMMARY

In one embodiment, there is provided a method of operating a multimodal user interface for an automobile. The method comprises determining, from speech input provided via a speech interface of the multimodal user interface, a task a user is requesting be performed, the task relating to display of information on a windshield of the automobile. The method further comprises determining at least one geometric parameter related to the task from at least one other input modality of the multimodal user interface and updating display of information on the windshield of the automobile in accordance with the task.

In another embodiment, there is provided at least one computer-readable storage medium encoded with computer-executable instructions that, when executed by a computer, cause the computer to carry out a method of operating a multimodal user interface for an automobile. The method comprises determining, from speech input provided via a speech interface of the multimodal user interface, a task a user is requesting be performed, determining at least one geometric parameter related to the task from at least one other input modality of the multimodal user interface, and controlling output of information in accordance with the task.

In a further embodiment, there is provided an apparatus comprising at least one processor and at least one computer-readable storage medium encoded with computer-executable instructions that, when executed by a computer, cause the computer to carry out a method of operating a multimodal user interface for a vehicle. The method comprises determining, from speech input provided via a speech interface of the multimodal user interface, a task a user is requesting be performed, determining at least one geometric parameter related to the task from at least one other input modality of the multimodal user interface, and performing the task in accordance with the at least one geometric parameter.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
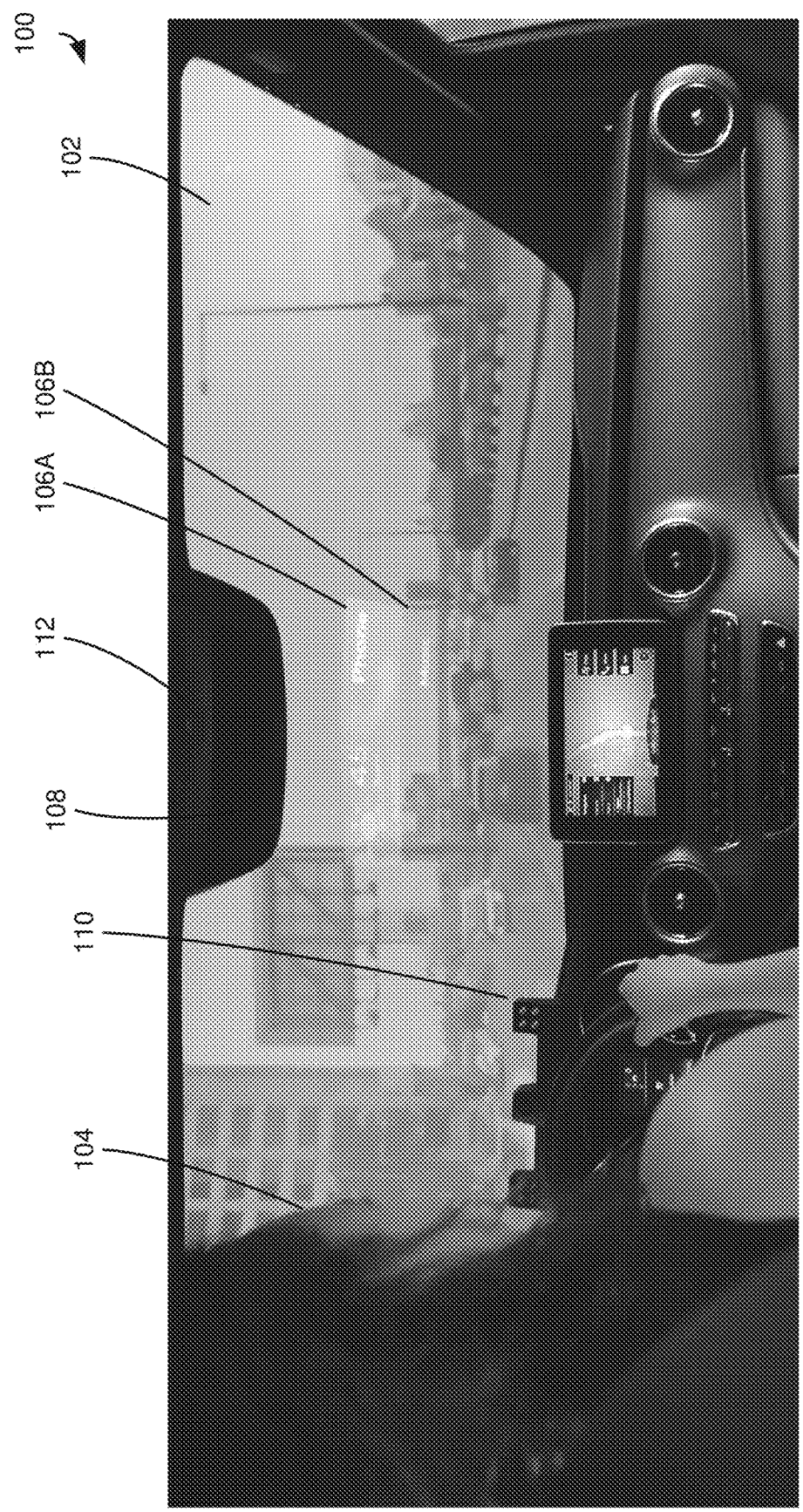
FIG. 1 depicts an example of a multimodal user interface with which some embodiments may operate.

Some embodiments described herein relate to a multimodal user interface for use in an automobile. The multimodal user interface may display information on a windshield of the automobile, such as by projecting information on the windshield, and may accept input from a user via multiple modalities, which may include a speech interface as well as other interfaces. The other interfaces may include interfaces allowing a user to provide geometric input, such as by indicating a position. For example, the other interfaces may include a gaze detection interface that monitors a user's gaze and determines an angle in which a user is looking at a time, where the angle is in the direction of the position the user intends to indicate. As another example, the other interfaces may include a gesture recognition interface that monitors a user's gestures and determines an angle in which a user gestured at a time, where the angle is in the direction of the position the user intends to indicate. In some embodiments, a user may define, using input provided via multiple different input modalities, a task to be performed. For example, the user may provide via the speech interface speech input describing a task that the user is requesting be performed, and may provide via one or more other interfaces geometric parameters regarding the task. The multimodal user interface may determine the task and the geometric parameters from the inputs and perform the task, which may include updating a display of information on the windshield in accordance with the task.

In some embodiments, the task may relate to a display of information on the windshield, such as moving displayed information from one position to another position or requesting new display of information at a position. In some such cases, the user may provide via the speech interface a request for movement of the information or request for new display of information, and may provide via a gaze detection interface and/or a gesture recognition interface a position at which the information is to be displayed. In some other embodiments, the task may relate to obtaining information regarding an object outside the automobile, in an environment of the automobile. In some such cases, the user may provide via the speech interface a request for information regarding an object in the environment, and may indicate the object with input provided via a gaze detection interface and/or a gesture recognition interface, by looking or gesturing at the object in the environment.

In some such embodiments, the user may provide such a position via the gaze detection interface and/or the gesture recognition interface by looking or gesturing in a particular direction, which may be received by a non-speech interface as an input angle. The multimodal user interface may analyze the angle in connection with a model, such as a three-dimensional model, to determine a point at which a line following the angle indicated by the user would intersect an object in the model. The model may be, for example, a model of the automobile and the object may be the windshield of the automobile, such that the user may indicate a position on the windshield by looking or gesturing toward the position on the windshield. The model may be, as another example, a model of an environment in which the automobile is traveling at a time at which at least part of the speech input was received and the object may be an object in the environment, such that the user may identify an object in the environment by looking or gesturing toward the object.

The inventors have recognized and appreciated that conventional user interfaces of automobiles are associated with unacceptably large risk of potential automobile collisions that may cause injury to the driver or passengers of the automobile or of other automobiles, or damage to the automobile or other property. Such collisions may occur when the driver of the automobile is distracted by operation of the conventional user interfaces and, while operating the conventional user interfaces, pays less attention to driving the automobile.

The inventors have further recognized and appreciated that it would be advantageous if user interfaces for automobiles were more straightforward for a user to operate. For example, it may reduce a risk of collisions if a user interface allowed a driver operating the interface to take his or her eyes off the road for less time than conventional user interfaces. As another example, it may reduce a risk of collisions if a user interface allowed a driver to keep his or her eyes on the road while viewing information in the user interface. As a further example, risk of collision may be reduced if a driver did not need to operate physical buttons or switches of the user interface to provide input, but could instead provide input with his or her voice and other input modalities.

Speech user interfaces are available for conventional automobiles, but the inventors have recognized and appreciated that such user interfaces are constrained in their ability to accept input from a user. Providing some forms of input via speech can be complex, requiring careful speaking of instructions to ensure precision of that input. For example, if a user wanted to ask a question about a building or other object the automobile is driving past, and the user does not have a precise identifier for the object (e.g., a street address), it may be difficult to provide speech input precisely describing the object so as to enable the user interface to query for information regarding the object. Providing such speech input may not only be difficult and cumbersome for the user, but the speech interface may prompt the user one or more times for disambiguation input, or the provision of the input may require a great deal of concentration or attention of the user. Such extended interactions, or interactions requiring attention, may be disadvantageous for an automobile setting, where it would be advantageous for the interface to be used quickly and without taking much of the user's attention, ensuring a driver can focus as much as possible on driving and avoiding collisions.

Moreover, the inventors have recognized and appreciated that it would be advantageous if a driver were able to reconfigure a user interface for an automobile to suit the user's style and preferences. When a user interface does not align with a user's style and preferences, it may be more cumbersome for the user to use and may take more concentration or attention for the user to use. In a driving setting this is disadvantageous. Accordingly, it would be beneficial for users if they were able to customize or otherwise arrange a user interface to fit their style and preferences.

Described herein are various techniques for operating a multimodal user interface for an automobile. The multimodal interface may accept input via a speech interface as well as one or more other modalities. In some embodiments, the other modalities may include modalities for providing geometric input, such as input describing one or more positions. In some embodiments, the other modalities may include a gaze detection interface and/or a gesture recognition interface. Using such interfaces, a user may provide input indicating a position by providing input indicating a position via a direction or angle input to the non-speech interface, such as by looking in the direction or angle or gesturing in the direction or angle.

For some tasks, providing geometric input (e.g., describing a position, shape, or dimension) may be well-suited for provision of parameters for a task to be performed. For example, if a user desires to know more about a landmark, building, or other object in an environment the user is driving through, the user could indicate the object by looking at the object or gesturing in the direction of the object. This may make interactions with a user interface more straightforward for the user, and could advantageously reduce an amount of time and/or attention needed for the interaction. With respect to the landmark query, for example, a user could speak the question "What is that?" and look or gesture at the landmark, after which the system could determine (using techniques described herein) the object at which the user was looking or gesturing at the time and perform a query for information about the object.

Such multimodal input that includes receiving geometric input may also be advantageous for arranging a user interface display, such as to align with a user's style or preferences. For example, if a driver would like to display a navigation interface in a user interface display, and would like it to be displayed at a position in the display that the user prefers, the user could speak a command "Display navigation there" and indicate the preferred position via gaze and/or gesture input. The multimodal interface could determine the location of "there" from analysis of the detected gaze/gesture, and determine from analysis of the speech input that the user would like the navigation interface to be displayed at that position. Multimodal input could also be used to rearrange information displayed in a user interface. For example, if a navigation interface is displayed in one position and the user would prefer it in another position, the user could speak a command "Move navigation there" and indicate the new position via gaze and/or gesture input. The multimodal interface could determine the location of "there" from analysis of the detected gaze/gesture, and determine from analysis of the speech input that the user would like the navigation interface to be moved to that position.

Accordingly, in some embodiments, a user may define a task to be performed using multiple different input modalities. For example, the user may provide via a speech interface speech input describing a task that the user is requesting be performed, and may provide via one or more other interfaces geometric parameters regarding the task. The multimodal user interface may determine the task and the geometric parameters from the inputs and update a display of information on the windshield in accordance with the task.

As described in more detail below, the geometric parameters for the task may include one or multiple positions related to the task. The multimodal interface may determine the positions from input provided by the user by a non-speech input modality. Such a non-speech modality may be, for example, a modality by which a user inputs a direction or angle. This may include a gaze detection interface that detects a direction or angle in which a user is looking. This may additionally or alternatively include a gesture recognition interface that detects a direction or angle in which a user is gesturing. The multimodal user interface may analyze the angle in connection with a model, such as a three-dimensional model, to determine a point at which a line following the angle indicated by the user would intersect an object in the model. The model may be, for example, a model of the automobile and the object may be the windshield of the automobile, such that the user may indicate a position on the windshield by looking or gesturing toward the position on the windshield. The model may be, as another example, a model of an environment in which the automobile is traveling at a time at which at least part of the speech input was received and the object may be an object in the environment, such that the user may identify an object in the environment by looking or gesturing toward the object.

In some embodiments, a user may input, via a non-speech input modality, multiple positions related to a task. For example, a task may relate to moving information (e.g., a navigation interface) displayed in the user interface and the user may reference both an initial position and the desired new position: "Move the navigation from there to there." In this example, both "there" terms correspond to a position that a user is indicating. Accordingly, the multimodal interface may determine two different positions, by determining from non-speech input modalities positions indicated at different points in time. As one example, the system may determine a time associated with each "there" that the user spoke, and may determine a position indicated by the user via a non-speech input modality at each of those times, though other techniques may be used and are discussed below. As another example of input of multiple positions related to a task, a user may request that information be displayed in a user interface within a particular shape and size specified by the user, such as a square, rectangle, or free-form shape. The user could specify a regular geometric shape (e.g., a square) with speech input, but the multimodal interface of some embodiments allows the user to indicate the shape by input of multiple positions. For example, the user could speak the input "Display navigation within this form" and sketch out the form (e.g., a square, a rectangle, another regular geometric shape, or a free-form shape) with non-speech input. The non-speech input may be, as described above, provided by gaze input or gesture input. The gaze detection interface and/or gesture recognition interface could determine a time-ordered sequence of positions indicated by a user, corresponding to a continuous sweep of gaze or gesture defining a shape or corresponding to a discrete set of points that define a shape (e.g., four corners of a square or rectangle, or two opposite corners of a square or rectangle).

It should be appreciated that embodiments are not limited to providing only geometric input using non-speech input. For example, a user may ask to resize information displayed in a user interface, such as by resizing a box containing the information. The user could speak a command requesting the resize (e.g., "Resize the navigation window") and then provide non-speech input to control the resizing. For example, the system may then resize the form based on the non-speech input, while the user is providing the non-speech input, and stop the resizing when the user stops providing the non-speech input. As a specific example of such input, in response to the user's spoken command, the multimodal interface may start monitoring a gaze or gesture of the user, or other non-speech input. If the user's hand is rising, for example, the multimodal interface may enlarge the navigation window until the user puts his or her hand down, at which point the system will stop resizing the navigation form. If the user's hand is dropping, the multimodal interface may similarly shrink the navigation window until the user puts his or her hand down. It should be appreciated that techniques other than tracking gesture movements up and down, or other than gesture, may be used for resizing.

It should also be appreciated that embodiments are not limited to using multimodal input to control display of information, as embodiments may operate with other types of tasks. For example, while examples described above and below relate to updating displayed information, in other embodiments a task input by a user may not result in a display of information but may result in an output of information in another form. For example, a user could provide multimodal input requesting that information be sent in an electronic message (e.g., email, SMS/text, or other messaging protocol) to another user. That multimodal input could include speech input with the request, and non-speech input that includes position information related to the task. For example, a user could speak "Send that building's address to Kevin" from which the multimodal interface could determine that a message is to be sent to "Kevin" (who might be identified from the user's contact list), and then determine from the non-speech input (e.g., as described above, such as using a direction of a user's gaze or gesture) that the user is referring to a building that was in the environment of the automobile at the time of the speech input. When such a task is performed, the system may not generate any output to be displayed. Other tasks that may not result in displayed output may also be performed using multimodal interfaces operating as described herein, as embodiments are not limited in this respect.

It should also be appreciated that while examples are described below of displaying information on a windshield of an automobile, embodiments are not limited to operating with any particular form of display. In some embodiments described below, an automobile's windshield may include a partially reflective layer that allows for reflecting some light projected toward the windshield. This may allow for a display in which information is projected from an interior of the car onto the windshield and displayed in a partially-transparent manner on the windshield. Such embodiments may be advantageous because passengers in the car may be able to view the display, as well as the driver. In other embodiments, information may be projected onto a windshield without the windshield having a partially reflective layer added to the windshield. For example, some embodiments may include a projector that projects light toward the windshield in a way that accounts for reflecting some light off of the air-windshield interface and toward the driver, to provide for a "heads-up display" (HUD). In such embodiments, the interface may be visible to the driver, but may be only partially visible or not visible to passengers. As another option, a driver may wear a screen or mask over his or her eyes (and/or any other part of his/her face) and information may be projected on the screen in a manner that makes it appear to the driver that the information is displayed on the windshield, and provides for an Augmented Reality (AR) interface. Other displays may also be used, as embodiments are not limited in this respect.

In some embodiments in which information is displayed on a screen or mark over or near a user's eyes (and/or any other part of a face), information may be displayed on the screen using AR techniques such that the information appears to the user as if displayed on a windshield. Various techniques are described herein for detecting a position on a windshield at which a user would like information displayed, and displaying information at that position in the windshield. Or, for detecting a position on a windshield at which a projection of a building or other object in the environment falls, and displaying information on the windshield at that projection such that the information appears adjacent to or superimposed on the building/object. In embodiments that use an AR display in which information is displayed on a screen over or near a part of a user's face, the screen may be at least partially transparent, such that the windshield and the environment may be seen through the screen. Information may be displayed on the screen using AR techniques, such that if a user indicates an area of a windshield on which information is to be displayed or indicates an object in an environment (using techniques described below), information may be displayed on the screen such that the information appears to the user as if it is displayed on the windshield at the indicated location or on the windshield on a projection of the object in the environment. As discussed below in connection with FIG. 9, when such AR techniques are used, the location on the screen at which the information is displayed may depend in part on a pose of the user's head or eyes with respect to the windshield or the environment. Known AR techniques may be used to display information at a position on a screen such that, to the user, the information appears located at a position in the windshield, with the position calculated based on the pose of the user's head or eyes, a 3D model of the vehicle, a 3D model of the environment, and/or other factors.

Examples are described herein of use of multimodal interfaces with automobiles. "Automobiles," as used herein, includes various classes of a wheeled motor vehicle, including cars, sedans, sport utility vehicles (SUVs), trucks (including light, medium, heavy duty, and other types of trucks), buses, and others. Those skilled in the art will appreciate, though, that techniques described herein may be readily used with types of vehicles other than automobiles. For example, multimodal interfaces described herein may be used with boats, planes, construction equipment, agriculture equipment, military equipment, and other types of vehicles.

In some examples below, a user operating a multimodal user interface may be referred to as a "driver" of an automobile. It should be appreciated that embodiments are not limited to receiving commands from any particular person. In some cases, a user operating the multimodal interface may be a driver, while in other cases a user operating the multimodal interface may be a passenger. It should also be appreciated that embodiments are not limited to operating with vehicles in which a person actively driving the vehicle or otherwise controlling operation of the vehicle, or limited to operating at times at which a person is actively driving or controlling operation of the vehicle. A user may operate the multimodal interface when the vehicle is not moving. Further, a user may operate the multimodal interface in a case that the vehicle is fully autonomous, or operating in an autonomous mode in which a user may be in a position to take control of the vehicle when the user requests that the vehicle exit the autonomous mode or when the vehicle exits the autonomous mode for any other reason.

Described below are various examples of multimodal interfaces and examples of ways in which a multimodal interface may be operated to interact with a user. It should be appreciated, however, that embodiments are not limited to operating in connection with any of the specific examples below, as these examples are merely illustrative. Other embodiments are possible.

FIG. 1 illustrates an example of a multimodal user interface 100 for an automobile that may operate in accordance with techniques described herein. The automobile in the example of FIG. 1 includes a windshield 102 on which information may be displayed. A driver 104 may operate the multimodal user interface to change display of the information, or request performance of other tasks, FIG. 1 illustrates two examples of user interface elements 106A, 106B projected on the windshield 102 for viewing by the driver 104. The elements 106A, 106B may be projected on the display using a projector 108 that outputs light onto the windshield 102. In some embodiments, as discussed above, the windshield 102 may have a partially reflective layer to reflect the projected light and form the display of the elements 106A, 106B. In other embodiments, the projector 108 may project light so as to form a HUD, by projecting light that will be partially reflected by the junction between the air and the windshield 102 and reflected toward driver 104. Other types of displays may be used, as embodiments are not limited in this respect.

As depicted in FIG. 1, element 106A is a rectangle labeled "Phone" to display information related to a phone that is associated with the multimodal user interface 100 (e.g., a smart phone of the driver 104, or another phone). The element 106A may display information transmitted to the multimodal user interface 100 by the phone, such as information about incoming calls or other messages (e.g., emails, SMS messages, etc.) or other information related to the phone (e.g., calendar reminders, app notifications, etc.). FIG. 1 illustrates the element 106A displaying weather information relayed to the interface 100 by the phone, showing that the weather is "45 degrees" and "Sunny." Element 106B is a rectangle labeled "Music" to display information about audio that may be playing in the automobile or that may be played in the automobile. The element 106B may, for example, display information on a current status of a radio of the automobile, such as an AM/FM radio station to which the radio is tuned, or may display information about music that is stored and/or playing on an electronic device with which the multimodal user interface 100 is associated (e.g., a smart phone of the driver 104 or other device).

It should be appreciated that elements 106A, 106B are merely illustrative of the types of information that may be displayed, and that other types of information may be displayed. For example, navigation information could be displayed, or news headlines could be displayed, or stock market information could be displayed, or any other type of information that a user may view using a computing device. Embodiments are not limited to operating with any particular type of information. Examples are described below of interactions between a user and the multimodal user interface 100, which may result in various types of information being displayed.

The driver 104 may operate the multimodal user interface 100 to perform various tasks, through providing input via one or multiple input modalities of the multimodal user interface 100. Embodiments are not limited to operating with any particular type of task.

In some embodiments, the task may relate to configuration or customization of the display of the multimodal user interface 100. For example, FIG. 1 illustrates the elements 106A, 106B in the middle of the windshield 102, stacked vertically with element 106A displayed above element 106B, and illustrates elements 106A, 106B as having the same shape (a rectangle) and size. The driver 104 may operate multimodal user interface 100 to change the position, shape, or size of the elements 106A, 106B, or to add new elements with new information to the display, or to remove elements from the display. For example, the driver 104 could desire to move the phone display over to the right-hand side of the windshield 102, in front of the front passenger seat of the automobile. To do so, the driver 104 may provide via a speech interface of the interface 100 speech input to "Move the phone display over there," and may provide via another interface of the multimodal user interface 100 geometric input indicating a position on the windshield 102 at which the driver 104 would like the element 106A displayed. As another example, the driver 104 could desire to add a navigation display. To do so, the driver 104 may provide via a speech interface of the interface 100 speech input to "Show navigation within this form" and may provide via another interface of the multimodal user interface 100 geometric input indicating a position on the windshield 102 and a shape in which the driver 104 would like the navigation information displayed at the position.

In other embodiments, the task may not relate to configuration of the interface 100, but may relate to an environment in which the automobile is operating. For example, the driver 104 may desire to know more about a landmark that the automobile is passing. To inquire, the driver 104 may provide via a speech interface of the interface 100 speech input to "Tell me about that" and provide via another interface of the multimodal user interface 100 geometric input indicating the landmark. The multi modal user interface 100 may, in response to the task, identify the landmark, query via a network connection for information regarding the landmark, and output to the driver 104 information regarding the landmark. The interface 100 may output the information by displaying the information on the windshield 102 and/or may output the information as audio, using text-to-speech techniques or other audio generation techniques.

In some embodiments, the multimodal user interface 100 may include one or more other input modalities that enable a user (e.g., driver 104) to provide geometric input, such as by indicating a position. Some such input modalities may receive input indicating a position by receiving input indicating a direction or angle, from which the multimodal user interface 100 may determine the position. In some embodiments, as discussed above, the other input modalities may include a gaze detection interface 110 and/or a gesture recognition interface 112.

Gaze detection interface 110 may track movement of eyes of one or more persons in the automobile, to determine at each instant in time a direction of each person's gaze. In the embodiment depicted in FIG. 1, gaze detection interface 110 is implemented to track a gaze of only one person, driver 104, but it should be appreciated that embodiments are not so limited. In some embodiments, a gaze detection interface 110 may be implemented for each seat of the automobile, such that the gaze detection interface 110 could track gaze of each driver or passenger in the automobile.

In the example of FIG. 1, gaze detection interface 110 includes light-emitting elements as well as a light-detection element. In particular, the gaze detection interface 110 includes eight infrared (IR) light-emitting diodes (LEDs), in two groups of four, and an infrared camera. The infrared light is emitted from the LEDs in the direction of the face of the driver 104, to illuminate the eyes of the driver 104. The infrared camera captures some of the IR light reflected by the eyes of the driver 104. The gaze detection interface is configured, using known image processing techniques for gaze detection, to determine a direction or angle in which the driver 104 is looking from analysis of the reflected IR light captured by the infrared camera. It should be appreciated, however, that embodiments that include gaze detection are not limited to using any particular form of gaze detection. Other gaze detection systems and techniques may be used.

Gesture recognition interface 112 may be implemented using any known technique for gesture recognition. In the embodiment of FIG. 1, gesture recognition interface 112 includes a camera that captures images of the passenger cabin of the automobile, at least in the area of the driver 104. Known image processing techniques may be used to determine gestures of the user. Such gestures may include pointing with a finger or hand, raising an arm or hand, lowering an arm or hand, opening or closing a hand, moving an arm or hand to outline a shape with a movement of the arm or hand, or other movements. Embodiments are not limited to operating with any particular type of gesture, or any particular type of gesture recognition.

Using techniques described below, when gaze detection interface 110, or gesture recognition interface 112, or another non-speech interface is used to provide geometric input in connection with a task, and speech input describing the task is provided via a speech interface, multimodal user interface 100 may perform the task in accordance with the speech input and the geometric input. In some embodiments, as discussed in more detail below, performing the task may include determining, from the geometric input, a position indicated by the geometric input, such as by analyzing a direction or angle indicated by a user with non-speech input in accordance with a model, to determine a position in the model indicated by the direction or angle.

Figure 2:
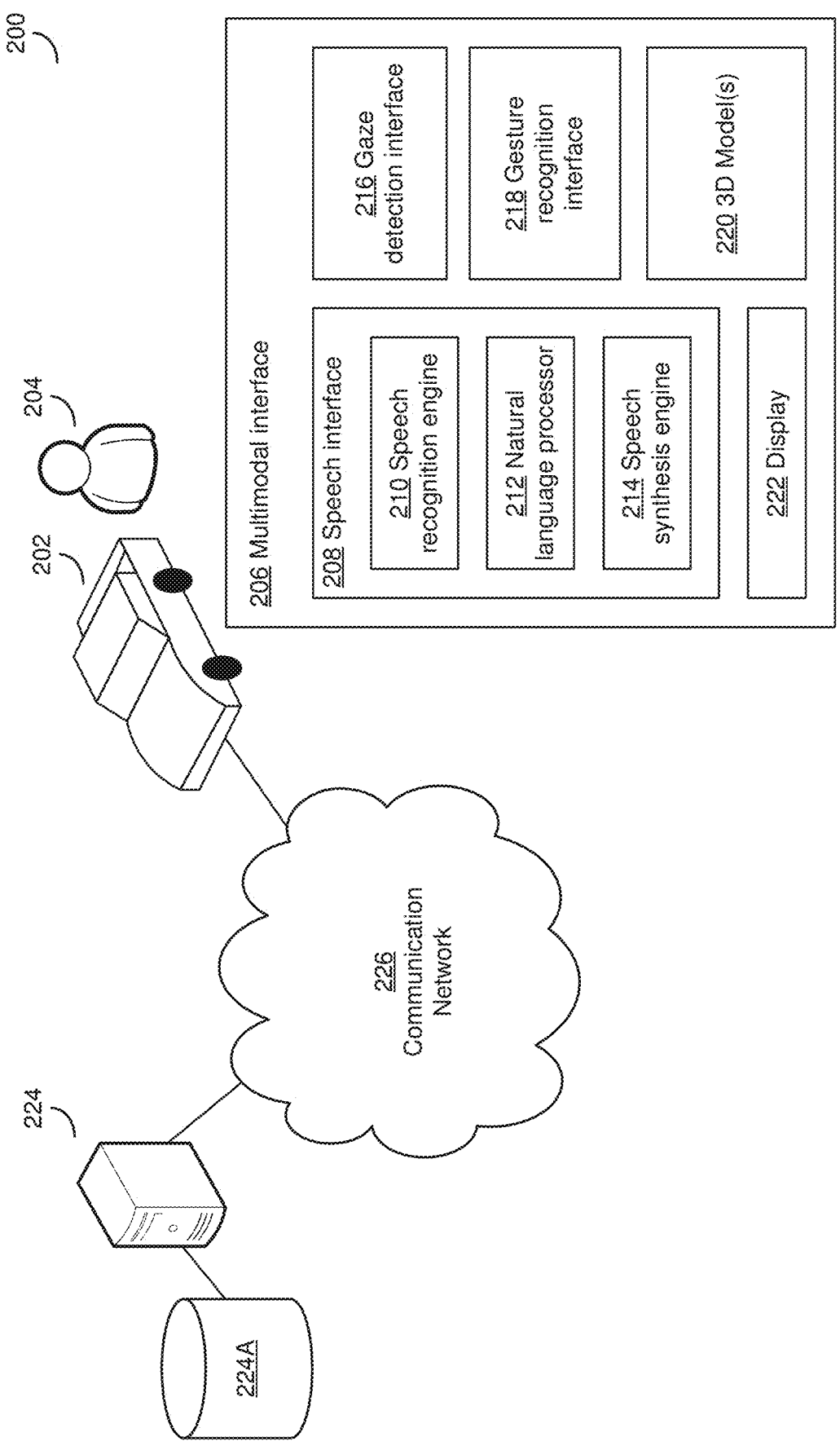
FIG. 2 is a sketch of some illustrative components of an example of a multimodal interface system.

FIG. 2 illustrates components of an exemplary system 200 in which a multimodal interface like the one of FIG. 1 may be used. The system 200 of FIG. 2 includes an automobile 202 and a user 204, who may be a driver or passenger of the automobile 202.

The automobile 202 may include a multimodal interface 206, which may implement techniques described above in connection with FIG. 1 and/or other interface techniques described herein.

The multimodal interface 206 includes a speech interface 208 to process speech input provided by user 204. In some embodiments, the user 204 may operate the multimodal interface 206 by providing, via the speech interface 208, speech input describing a task that the user 204 would like performed. To determine the task, the speech interface 208 may process the speech input using a speech recognition engine 210 that may implement automatic speech recognition (ASR) techniques and a natural language processor 212 that may implement natural language processing (NLP) and/or natural language understanding (NLU) techniques.

The speech recognition engine 210 may accept as input an input audio signal that was received by one or more microphones of the speech interface 208, which may be included in the automobile 202. The speech recognition engine 210 may apply suitable ASR techniques to recognize words and/or phrases included in the speech input, such as using one or more acoustic models, lexicons, grammars, and/or language models. Embodiments are not limited to operating with any particular ASR techniques. The speech recognition engine 210 may output a recognition result that includes words or phrases that the speech recognition engine 210 has determined are likely to be included in the speech input. In some embodiments, the speech recognition engine 210 may also output a confidence score that is a measure generated by the speech recognition engine 210 indicating a likelihood that the output recognition result is a correct recognition result. In some embodiments, the speech recognition engine 210 may also output multiple potential alternative speech recognition results and confidence scores associated with each such potential alternative results, in the form of an N-best list of recognition results.

The output of the speech recognition engine 210 including the words and/or phrases of one or more recognition results and, in some embodiments, the associated confidence score(s) may be provided to the natural language processor 212. The natural language processor 212 may analyze the words and/or phrases to determine a meaning expressed by the words and/or phrases. That meaning may indicate the task that the user 204 is requesting be performed. For example, the user 204 may reference moving elements on a display, or adding elements to the display, or changing a manner in which elements are displayed (e.g., changing a color, size, shape, etc.), or an object in the environment about which the user 204 would like more information, or sending information about an object to another person, or any of a variety of other tasks. The natural language processor 212 may semantically interpret the words and/or phrases output by the speech recognition engine 210 to determine the meaning expressed by the speech input and to determine the task requested by the user 204. The natural language processor 212 may include one or more ontologies to link words or phrases to concepts the user 204 may express, such as ontologies related to user interface interaction concepts or other tasks the user 204 may request be performed. Embodiments are not limited to implementing any particular NLP or NLU techniques to determine a task described by the user 204 in speech input.

In some embodiments, as part of determining a task the user 204 is requesting be performed, the natural language processor 212 may determine that the user 204 has provided ambiguous input or has provided insufficient input to perform the task requested by the user 204. For example, if the user 204 were to speak "Move that element" as part of requesting that information on the display be moved, the multimodal interface 206 may have insufficient information to perform the task because the user 204 did not indicate a desired target position. As another example, if the user 204 were to speak "Change that element," the user 204 may desire any of a variety of changes be made to an element on a display (e.g., change color, shape, size, etc.), but it may be unclear to the multimodal user interface 206 what change the user 204 would like. In some embodiments, if the natural language processor 212 determines that insufficient input or ambiguous input has been provided, the natural language processor may indicate the ambiguity or insufficiency and the speech interface 208 may prompt the user 204 to resolve the ambiguity or input additional information. In some such embodiments, the speech interface 208 may output the prompt via a speech synthesis engine 214. Speech synthesis engine 214 may output audio of speech to the user 204 using any suitable speech synthesis technique, including output of pre-recorded audio or text-to-speech (TTS) techniques. In some embodiments, the speech synthesis engine 214 may also be used to output other information to a user 204, such as output of information requested by the user 204 (e.g., information on a landmark requested by the user 204), or navigation information, or confirmation of performance of a task, or other information.

In some embodiments, the natural language processor 212 may also identify ambiguities that are not resolved through prompting of the user 204, but may be resolved through input received through other input modalities of the multimodal interface 206. For example, speech input may include terms that refer to positions in a display of the interface 206 or in an environment of the automobile, or that refer to particular elements in the display of the interface 206 or objects in the environment, or other position information. Such terms may include demonstrative pronouns like "That" or "this", or place adverbs like "here" or "there." Using those examples, when the natural language processor 212 identifies in the speech input a term that is a demonstrative pronoun or a place adverb, and determines that the term refers to a parameter of a task to be performed, the natural language processor 2.12 may identify the term to the multimodal interface 206 and identify that the term is to be disambiguated to perform the task. The multimodal interface may then determine the position or object referenced by the term using other input modalities of the multimodal interface 206.

In the embodiment of FIG. 2, the other input modalities of the multimodal interface 206 include a gaze detection interface 216 and a gesture recognition interface 218. When the natural language processor 212 determines (e.g., from detection of a term that indicates a position or object, such as a demonstrative pronoun or a place adverb) that the speech input contains an ambiguity that may be resolved with input received via another modality, the multimodal interface 206 will obtain from the gaze detection interface 216 and/or the gesture recognition interface 218 geometric input that was provided via one (or both) of those interfaces. For example, the multimodal interface 206, upon receiving from the natural language processor 212 an indication that additional input is to be obtained from at least one of the non-speech modalities, and in some embodiments a time at which that additional input was provided, may request that one or both of the interfaces 216, 218 provide the geometric input that was received by the interfaces. For some tasks, such geometric input may be an angle or direction in which the user 204 looked or gestured. For other tasks, such geometric input may be an amount by which the user 204 lifted or dropped a hand or arm. For other tasks, such geometric input may be a shape drawn by a gesture or gaze of the user 204.

For some tasks, upon receiving the geometric input from one or both of the interfaces 216, 218, the multimodal interface 206 may determine a position indicated by the geometric input. For example, if the speech input describes a task to be performed with respect to "that" information on the display or with respect to "there," the multimodal interface 206 determines from the geometric input a position indicated by the user and associated with the term "that" or the term "there." To do so, in some embodiments the multimodal interface 206 may make use of one or more three-dimensional (3D) models 220.

The model(s) 220 may include a three-dimensional model of the automobile 202. The model of the automobile 202 may include definitions of placements of components of the automobile 202, such as placements of a windshield of the automobile, dashboard components, or other components. Using information on a position of a head, arm, or hand of the driver and the geometric input received from the interfaces 216, 218, the multimodal interface 206 may determine a position in the model that corresponds to the geometric input. For example, if the geometric input received from the interfaces 216, 218 is an angle or direction in which a user looked, the interface 206 may determine in the model a position at which a line drawn along the angle or direction will intersect a component (e.g., the dashboard, or windshield) in the model. The interface 206 may make the determination using a physics engine or a collision detection engine that analyzes the model in connection with a vector defined by the geometric input provided by the interfaces 216, 218, extending from a position of the eyes of the user 204 (in the case of gaze detection) or from a position of the hand of the user 204 (in the case of gesture recognition). Such a model of the automobile 202 may be obtained from a manufacturer of the automobile 202 or generated from computer-assisted drafting (CAD) drawings of the automobile 202 provided by the manufacturer of the automobile. The model may alternatively be generated by performing a three-dimensional scan of the automobile 202. Such models may be obtained and/or generated for different makes and models of automobiles.

The model(s) 220 may additionally or alternatively include a three-dimensional model of the environment in which the automobile 202 is traveling. Such a three-dimensional model may include, for example, three-dimensional elements corresponding to buildings and other objects in the environment. Such a model may be constructed from map data retrieved from a mapping service. Such map data may be three-dimensional map data that includes three-dimensional data for objects in an environment. Alternatively, such map data may include a two-dimensional map that indicates footprints of buildings and other objects and also includes, for each such building or object, height data. In the latter case, the two-dimensional footprint data may be processed together with the height data to generate a number of three-dimensional elements in a three-dimensional model, where each element has a footprint matching the footprint identified by the mapping data and then extends straight up on all sides to the height indicated for the building/object. Using techniques similar to those described in the preceding paragraph, the geometric input provided via the interfaces 216, 218 may he analyzed together with the model to determine a position at which a line drawn along an angle or direction indicated by the geometric input will intersect a building or other object represented in the model.

The multimodal interface 206 may also include a display 222, which may be used to output information to the user 204. As discussed above, the display 222 may include a projection of information onto a windshield of the automobile 202 via a partially-reflective layer of the windshield, a projection of information onto the windshield in the manner of a HUD, an augmented reality (AR) display, a display that is on a device worn by the user 204, or other form of display. Embodiments are not limited to operating with any particular form of display.

In some embodiments, the multimodal interface 206 may be implemented within the automobile 2.02 may a manufacturer of the automobile 202, at a time that the automobile 202 was manufactured. In such cases, the multimodal interface 206 may be an original equipment manufacturer (OEM) component for the automobile 202. In other embodiments, one, some, or all components of the multimodal interface 206 may be added to the automobile 202 following manufacture and sale of the automobile 202, such as in the form of an aftermarket product for the automobile 202. Embodiments are not limited in this respect.

Embodiments are not limited to implementing the multimodal interface 206, and the components thereof, in any particular manner. In some embodiments, each of the components of the multimodal interface 206 may be implemented at least in part in the form of computer-executable instructions that execute on one or more processors. In some embodiments, the multimodal interface 206 may be implemented wholly within the automobile 202, with the processor(s) on which the multimodal interface 206 executes located within the automobile 202. In other embodiments, the multimodal interface 206 may be implemented using client-server techniques, with part of the interface 206 implemented within the automobile 202 and part implemented remote from the automobile 202. For example, sensing components of the interface 206 (e.g., IR LEDs and IR camera of a gaze detection interface 216) and output components of the interface 206 (e.g., microphone and speakers for the speech interface 208, display 222) may be implemented within the automobile 202, but analysis functionality may be implemented remote from the automobile 202, in one or more servers. Such analysis functionality may include speech recognition engine 210, natural language processor 212, the functionality of the interface 206 to build and/or analyze the model(s) 220, image processing of the interfaces 216, 218, and/or any other functionality. It should be appreciated that embodiments are not limited to dividing functionality between client and server in any particular manner, and that a division of functionality may be made in various ways based on, for example, computing resources available at the automobile 202, availability of wireless connectivity, and/or bandwidth of the wireless connectivity.

Accordingly, in some embodiments, during operation the multimodal interface 206 may communicate with one or more computing devices 224 that may be implemented remote from the automobile 202. Such computing devices 224 may include one or more data stores 224A that include information that may be used by the multimodal interface 206 as part of performing tasks specified by the user 204 via the multimodal interface 206. For example, if the user 204 requests information regarding a building in the environment, once the multimodal interface 206 identifies the building, the interface 206 may query one or more servers 224 for information about the building. The query to the server(s) 224 may include a web search, submitted to a search engine, or may include any other type of query. As another example, if a user submits a query for navigation information, a query may be submitted to a server 224 associated with a mapping/navigation service.

When components of the automobile 202 (e, 2., components of the interface 206) communicate with remote computing devices, communications may be sent and received via one or more communication networks 226. The network(s) 226 may be one or more wired and/or wireless communication networks, including the Internet. In some cases, the network(s) 226 may include a wireless wide area network (WWAN), such as a cellular network, over which the automobile 202 sends and receives communications. The automobile 202 may wirelessly communicate using a network adapter for transmitting wireless communications over a network of the network(s) 226, which may be a network adapter specifically associated with the automobile 202 and/or may be a communications device of the user 204 that is present in the automobile 202 when the user 204 is riding in the automobile, such as a smart phone.

Examples of multimodal interfaces and components thereof were discussed above in connection with FIGS. 1-2. FIGS. 3-10 illustrate examples of techniques that may be implemented by some multimodal interfaces, in accordance with some techniques described herein.

Figure 3:
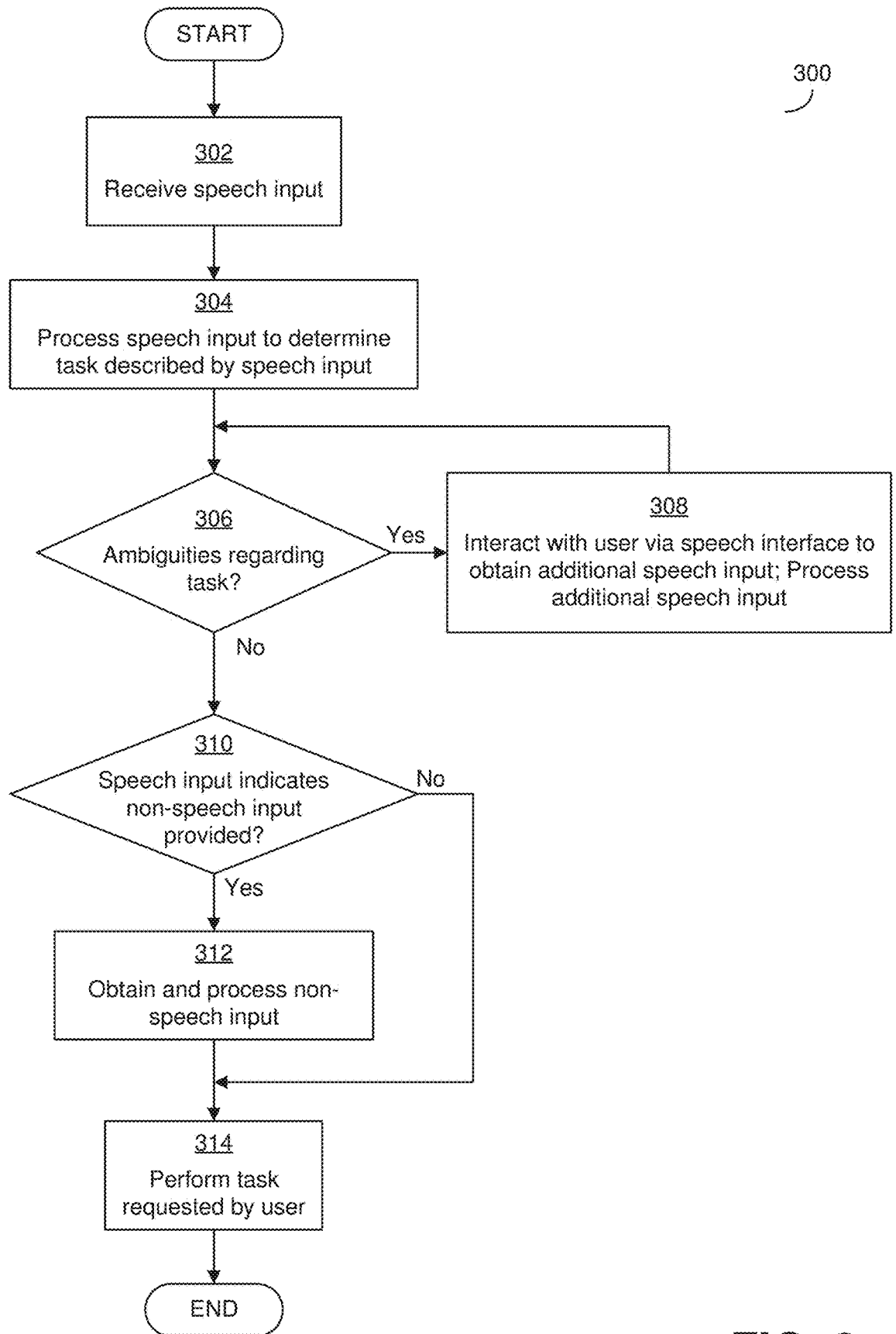
FIG. 3 is a flowchart for a process that may be implemented in some embodiments to perform tasks in accordance with multimodal input provided by a user.

FIG. 3 illustrates a process 300 that may be implemented by a multimodal interface in some embodiments to perform a task based on multimodal input provided by a user. The process 300 of FIG. 3 may be used with a multimodal interface of a vehicle such as an automobile, including the examples of interfaces and automobiles discussed above in connection with FIGS. 1-2. The multimodal interface may be configured with one or more models, such as a model of the automobile with which the multimodal interface is used. The process 300 may be performed by a task facility of the multimodal interface. The task facility may be implemented as computer-executable instructions executed on one or more processors of the multimodal interface, which may be local and/or remote to the automobile. The task facility may interact with components of the multimodal interface to determine a task a user is requesting be performed, then perform the task.

The process 300 begins in block 302 in which the task facility receives speech input via a speech interface of the multimodal speech interface. The task facility may receive the speech input in any suitable manner, including in response to an explicit input from the user such as a trigger word that triggers receipt of speech input via the speech interface, or a trigger button that the user presses to indicate the start of speech input, through monitoring audio over time to determine from context clues when the user is providing speech input to the speech interface (as opposed to, for example, speaking to another passenger of the automobile, singing along with the radio, or making other sounds), or through any other technique for receipt of speech input. In block 304, the task facility requests that the speech input be processed to determine a task described by the speech input. Processing the speech may include performing ASR and/or natural language processing on the speech, including using techniques described above in connection with FIG. 2. The processing may also include matching the speech input to a task to be performed. In some embodiments, the task facility may be configured with information regarding a set of tasks that may be performed with the multimodal interface. Each task may be associated with a set of one or more parameters that define the task and that are to be input to enable the task to be performed. For example, for a task relating to moving a user interface element in a display, the task may require input of two parameters: an identification of the user interface element to be moved, and an identification of the desired target position of that user interface element.

In block 306, the task facility determines, based on output from the processing of the speech input, whether the speech input includes ambiguities regarding the task to be performed, such that the task is unclear or cannot be performed. If so, then in block 308 the task facility interacts with the user in block 308 regarding the ambiguities to obtain additional information. The interactions of block 308 may be via the speech interface, through outputting prompts to the user via speech synthesis and receiving additional speech input. The precise manner of the interactions may depend on the ambiguity to be resolved. For example, if the processing of block 304 could not match the speech input to a task, the task facility may prompt the user in block 308 to provide more information regarding the task the user wishes performed, Once the task facility determines in block 306 there are no ambiguities with respect to the task to be performed and that sufficient information has been provided for performing that task, the task facility determines in block 310 whether the speech input indicates that non-speech input for the task has been provided. The speech input may indicate that non-speech input has been provided because there is insufficient information for performing the task included in the speech input and because the speech input includes an ambiguity that relates to the missing information. For example, the task facility may determine from the processing of the speech input in block 304 (e.g., using natural language processing) that the speech input includes ambiguities as to the meaning of "that" and "there" in the speech input "Move that element there". In addition, the task facility may determine from processing of the speech input in block 304 (e.g., using natural language processing) that the speech input relates to a task that is moving user interface elements in the display. As discussed above, the task facility may be configured with information regarding that task, which indicates that the task requires input of an identification of the user interface element to be moved, and an identification of the desired target position of that user interface element. The task facility may receive from the natural language processor an output indicating that the "that" and "there" are ambiguous, but that the meaning of "that element" is that the user is referring to a particular element and that the meaning of "there" is that the user is referring to a position. The task facility may determine that these two ambiguities relate to the required information for the task and determine that the ambiguities may be resolved by determining whether the user provided other non-speech input at the time the speech input was provided.

The task facility may also, in some embodiments, determine whether non-speech input has been provided based on presence of certain types of words or phrases in the speech input, such as whether certain parts of speech are included. For example, if natural language processing of block 304 indicates that the speech input includes demonstrative pronouns (e.g., "this" and "that") or place adverbs (e.g., "here" and "there"). The task facility may be configured to obtain non-speech input when such terms are included.

If so, in block 310 the task facility obtains and processes non-speech input received via other modalities of the multimodal interface, such as gaze detection or gesture recognition. The task facility may query the other input modalities for whether input was provided during one or more times associated with the speech input, as discussed in greater detail below. The task facility may also process input obtained via the other input modalities, such as geometric input (e.g., a direction or angle indicated, a size indicated, or a shape indicated) to determine the parameter of the task to be performed. For example, as described above and in greater detail below, if the task facility determines that the gaze detection and/or gesture recognition determined a particular angle or direction in which the user looked or gestured, the task facility may analyze that angle or direction in accordance with a model to determine a position to which the user was referring or an object to which the user was referring with the input.

Once the task facility has obtained and processed the non-speech input that resolves the ambiguities in the speech input, or if the task facility determines in block 310 that no non-speech input was provided, the task facility performs the task requested by the user. Performing the task may, in some cases, including updating a display of the multimodal interface to change information displayed or a manner in which the information is displayed, in accordance with the task. In other cases, performing the task may additionally or alternatively include retrieving information from a remote computing device so as to obtain information to be output to a user, including output via the display and/or a speech synthesis interface, or output in any other suitable manner. In other cases, performing the task may include triggering transmission of one or more messages to one or more destinations, such as other users. As embodiments are not limited to operating with any particular type of task, performing the task may include performing a variety of operations.

In some embodiments, performing the task may also include configuring the multimodal interface to take action in accordance with the task at a later time. For example, a user may request some tasks be performed at the time of the input (e.g., "Move that info there") and may request some tasks be performed that relate to programming the multimodal interface to perform in a certain manner. As an example of the latter category, the user could provide speech input request that "When a phone call is received, place the incoming call notification there" and provide non-speech input indicating a position on the display. The task facility may configure the multimodal interface such that, when an incoming call is received, a notification window is displayed at the indicated position. But, the task facility may not change the display at the time of the input or provide output other than a confirmation of receipt of the input and/or performance of the task.

Once the task facility performs the task requested by the user, the process 314 ends.

While not illustrated in FIG. 3, in some embodiments the task facility may interact with a user prior to performance of the task, if after receiving and processing the speech and non-speech input the task facility determines ambiguities remain in the input or there is insufficient information to perform the task, such as because one or more of the parameters of the task are missing. For example, in some cases non-speech input may be ambiguous. A driver of a vehicle may glance quickly at a position on a windshield at which the driver would like a user interface element positioned, but may glance too quickly for the gaze detection facility to be confident of the angle at which the user was looking. Or if a user gestures toward a part of the windshield using a gesture that is not a point (e.g., a wave of the hand), the gesture may not be sufficiently precise for the task facility to determine a new position to which to move a user interface element. Or, a combination of speech input and non-speech input may still lack some information needed to perform a task. Accordingly, in some embodiments the task facility may interact with the user as in block 308, to obtain additional speech and/or non-speech input and determine each of the needed parameters for the task, before proceeding to perform the task in block 314.

In addition, while not illustrated in FIG. 3, in some embodiments a task facility may determine a user from which the speech input was received, to determine a user from which to receive non-speech input. In some embodiments, a multimodal interface may operate with only one person in an automobile, such as by only accepting input from a driver of the automobile. In such embodiments, when speech input is received, the one monitored person (e.g., the driver) may be monitored for non-speech input. In other embodiments, however, the multimodal interface may accept input from any person in the automobile and may be configured to accept multimodal input from any such person. Accordingly, in some embodiments, the task facility may determine such as by analyzing the speech input using audio localization or position detection or, in a case that a user presses a button or provides another explicit input prior to providing speech input, by identifying which user's button was pressed a person in the automobile who provided the non-speech input. The task facility may then obtain from the non-speech input modalities input that was provided by that person during the time of the speech input.

Figure 4A:
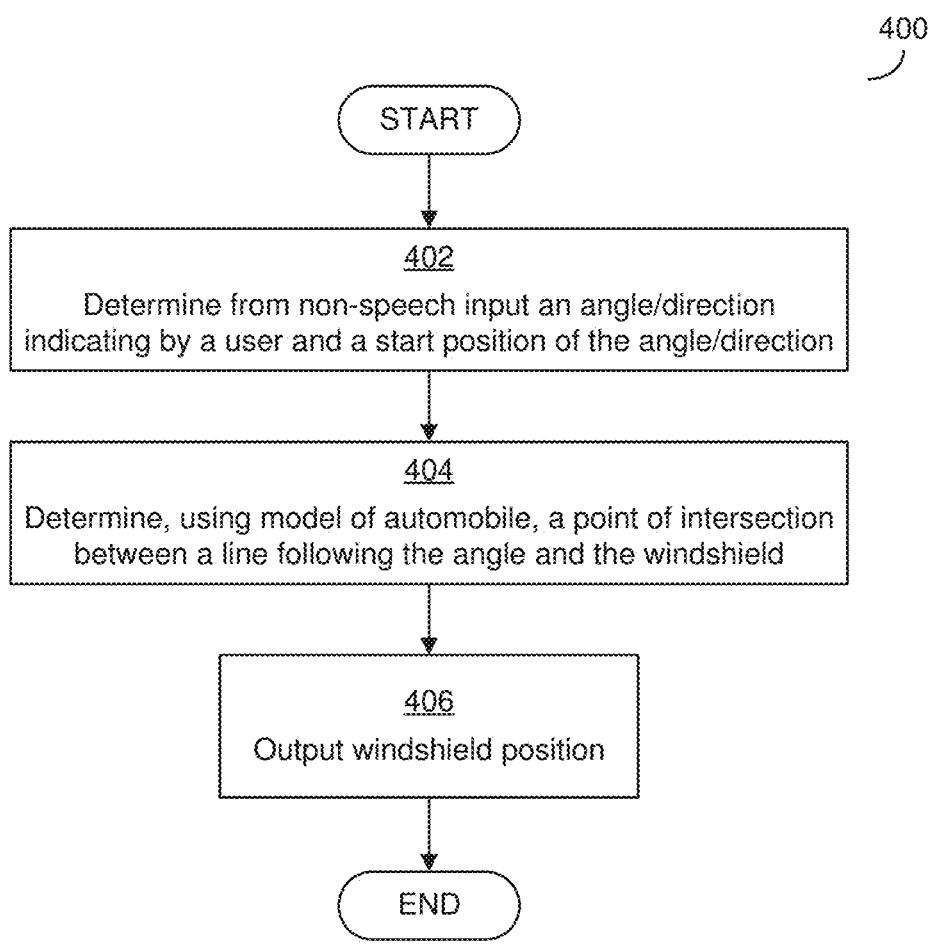
FIGS. 4A and 4B are flowcharts for processes that may be implemented in some embodiments to identify positions indicated by non-speech input provided by a user.
Figure 4B:
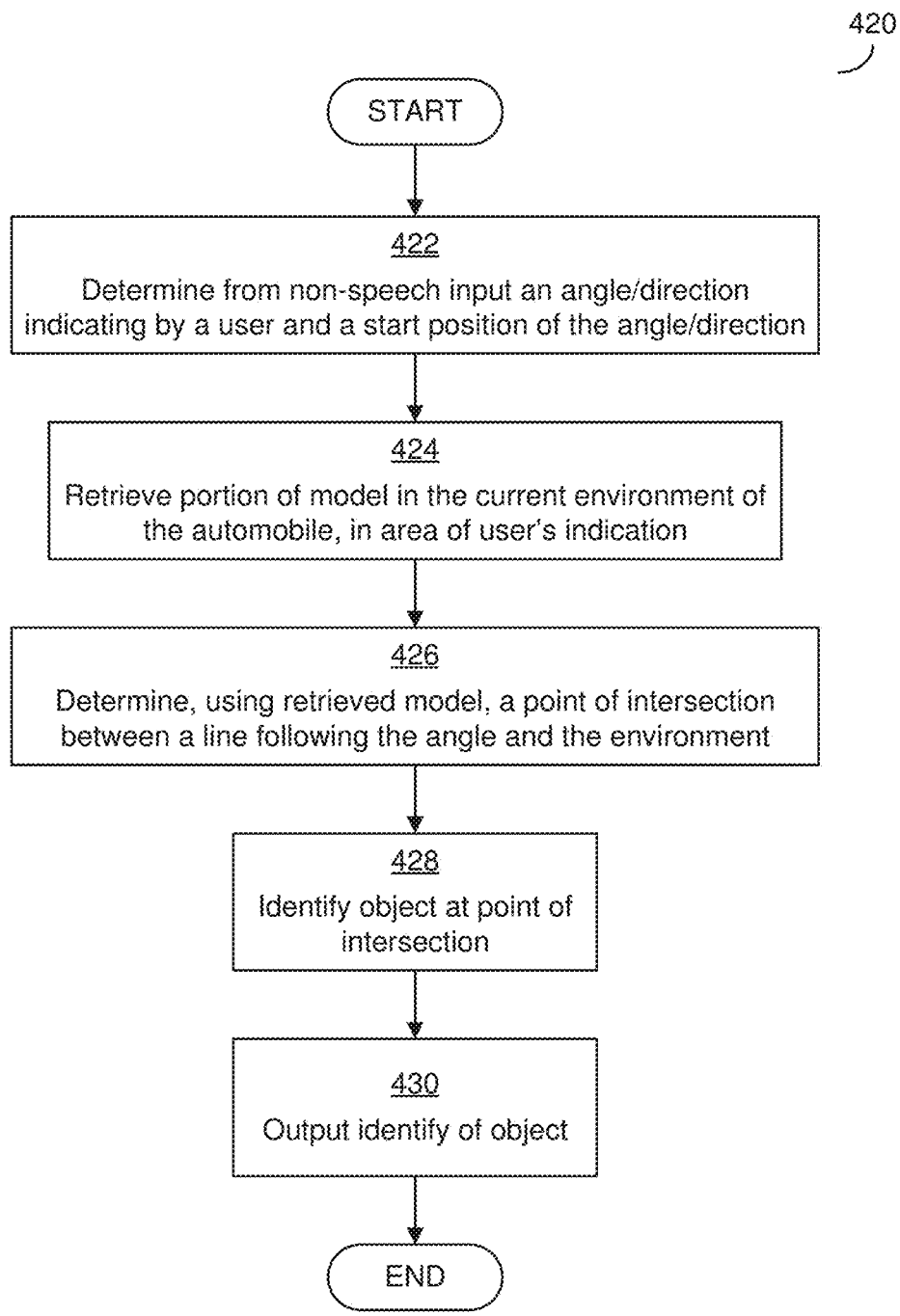
Figure 5:
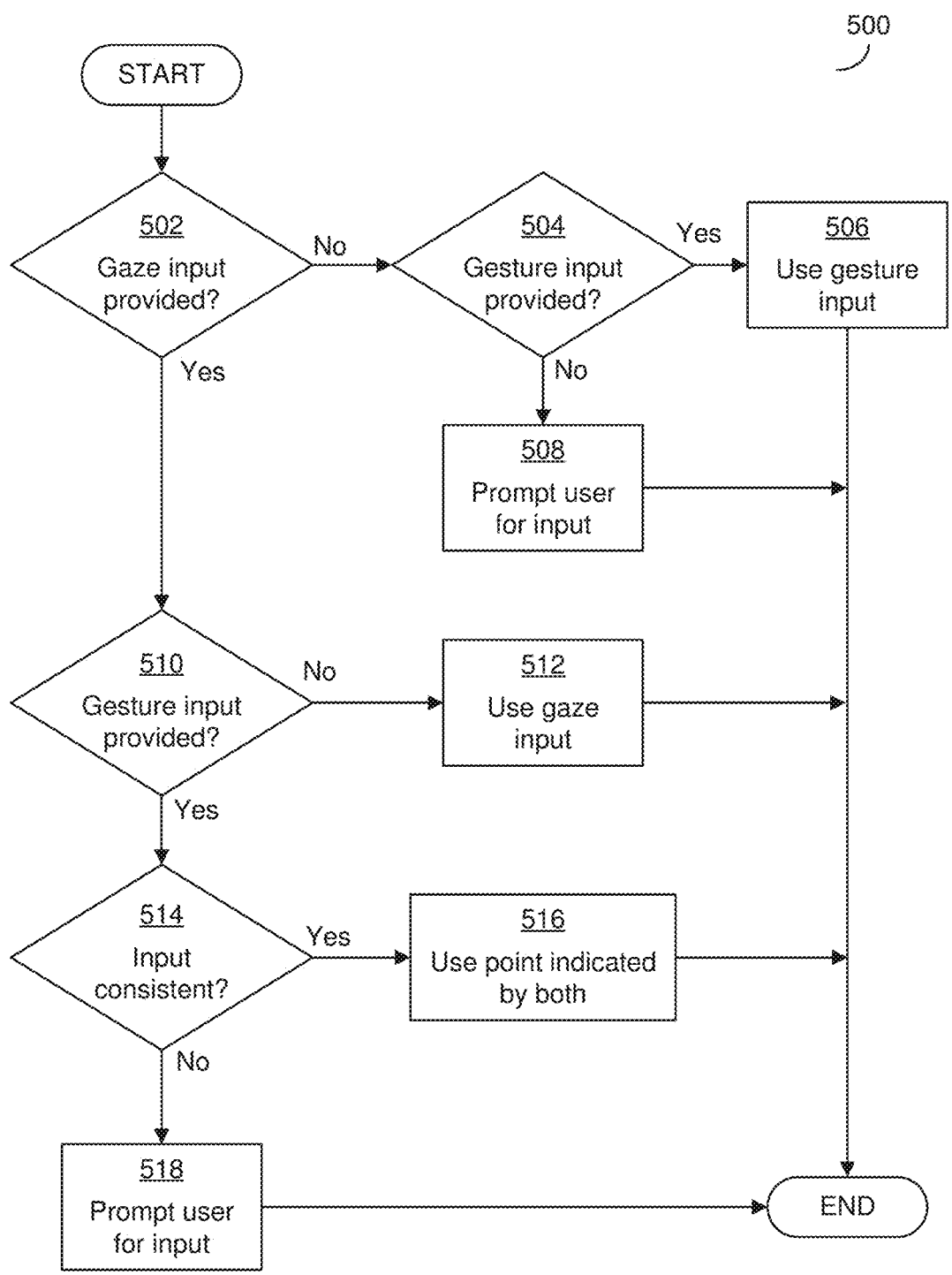
FIG. 5 is a flowchart for a process that may be implemented in some embodiments to determine which modality a user used to provide non-speech input.

FIG. 3 described a process in which non-speech input was obtained from non-speech modalities, including geometric input that may indicate an angle or direction in which a user looked or gestured, and determining a position or object from that non-speech input. FIGS. 4A and 4B are examples of processes that may be used for such obtaining and processing of non-speech input.

The process of FIG. 4A may be used to identify a position on a windshield indicated by a user, which may be useful if a user is providing speech input regarding control or customization of the user interface. Prior to the start of FIG. 4A, a 3D model of an automobile may be received, such as from a manufacturer of the automobile or from a 3D scan of the automobile (or of another automobile of the same make and model). The 3D model may indicate position of components of the automobile, such as a position of a dashboard, steering wheel, HVAC (Heating, Ventilation, and Air Conditioning) vents, windshield, or other components of an automobile.

FIG. 4A begins in block 402, in which a task facility determines from non-speech input an angle or direction indicated by a user, such as through a look by the user detected using a gaze detection interface or through a gesture provided by the user via a gesture recognition interface. The task facility may also determine from the non-speech input modalities a start position of the angle or direction. The start position may correspond, for gaze detection, to a position of the user's eyes at the time the gaze was input, such as from monitoring a head pose of the user. The start position may correspond, for gesture recognition, to a position of a user's hand or arm at the time the gesture was input.

The task facility may next, in block 404, determine a point of intersection with the windshield of the automobile of a line following the angle from the start position. In some embodiments, the task facility may analyze the model in connection with a vector that starts at the start position and follows the angle/direction detected by the non-speech interface. The task facility may use a collision detection engine or other physics engine in this analysis, to determine when the vector intersects the windshield in the model, In block 406, once the task facility determines the windshield position, the facility outputs the windshield position for use in performance of a task, and the process 406 ends. The windshield position may be used in any of a variety of ways, depending on the speech input and the task. For example, if the user spoke the command "Move that element there," two windshield positions may be determined, for "that element" and for "there," and they may be used in different ways. The windshield position for "that element" may be used in connection with information indicating current positions of user interface elements, to identify the user interface element to which the user is referring. The windshield position for "there" may be used to identify the target position for the movement, such that the task facility configures the display to show the identified user interface element at the desired position. It should be appreciated that, because embodiments are not limited to operating with particular tasks, embodiments are also not limited to operating with particular user interface elements that may be referenced with non-speech input. While an example has been given of identifying an information container in a display, so as to move the information container, non-speech input may also be used to identify a user interface element with which the user would like to interact. For example, a display could include virtual buttons that a user could press, by speaking the command "Press that button" and looking or gesturing at the button. As another example, if a navigation interface is displayed, the user could look at a position in map and provide speech input to "Navigate to there." Embodiments are not limited to particular types of content that may be displayed in a display or tasks that may be performed with multimodal input to interact with that content.

The process 420 of FIG. 4B may be used to identify a position or object in an environment in which an automobile is operating, to which a user refers using non-speech input. This may be useful, for example, if a user provides speech input that refers to an object in the environment, such as an inquiry about a landmark in the environment (e.g., "What is that statue?" or "What is the name of that mountain?" or "What businesses are in that building?"). The process 420 of FIG. 4B may make use of a 3D model of the environment in which the automobile is operating. As discussed above, the 3D model may be retrieved from a mapping service and/or generated from data provided by a mapping service. In some cases in which the model is generated, as discussed above, a mapping service may provide two-dimensional footprint information for objects in an environment and height information for each object, and a 3D model may be generated by constructing a model having an element for each object, with a footprint indicated by the mapping service data for the object and straight sides that extend up to the indicated height for the object.

The process 420 begins in block 422, in which a task facility determines from non-speech input an angle or direction indicated by a user, such as through a look by the user detected using a gaze detection interface or through a gesture provided by the user via a gesture recognition interface. The task facility may also determine from the non-speech input modalities a start position of the angle or direction. The start position may correspond, for gaze detection, to a position of the user's eyes at the time the gaze was input, such as from monitoring a head pose of the user. The start position may correspond, for gesture recognition, to a position of a user's hand or arm at the time the gesture was input.

In block 424, the task facility may obtain at least a part of a 31) model of an environment in which the automobile is operating. Maintaining in active memory a 3D model of a complete environment, such as a whole city or whole region, may be computationally intensive. In some embodiments it may be advantageous to retrieve, in response to a user's input of a task regarding the environment, a portion of a model that includes data for a position of the automobile at the time the input was provided by the user. The portion of the model may also be, rather than for the complete surroundings of the automobile, only for a portion of the surroundings of the automobile that is in an area of the user's indication. For example, the task facility may obtain a wedge or cone of the model that follows a vector defined by the start position and the angle determined in block 422. Accordingly, in block 424, the task facility queries a data store for a portion of a 3D model of the environment. The query to the data store may include the automobile's current position in the environment, such as its Global Positioning System (GPS) location, and an angle in which the user is looking in the environment.

In block 426, the task facility uses the retrieved model to determine a point of intersection with an element in the model of a line following the angle of block 422 from the start position of block 422. In some embodiments, the task facility may analyze the model in connection with a vector that starts at the start position and follows the angle detected by the non-speech interface. The task facility may use a collision detection engine or other physics engine in this analysis, to determine when the vector intersects the element in the model.

In block 428, the task facility may identify an object in the environment that corresponds to the element of the model that was determined in block 426. To identify the object that corresponds to the element, the task facility may query for information regarding the object. The query may include determining a street address or geographic location (e.g., GPS location) of the object in the environment to which the element of the model corresponds. Identifying the street address or geographic location may include reviewing map data corresponding to the model retrieved in block 424. Once the street address or geographic location is obtained, the task facility may query a data store for information regarding the street address or geographic location, such as by submitting a query to a web search service. In some cases, additional information may be obtained through the query, such as in a case that a name of a landmark may be obtained or a name of a building may be obtained. In other cases, the query may not result in additional identification information, and the street address or geographic position may what the task facility has available to it to identify the object.

In block 430, the task facility outputs the identity of the object, and the process 420 ends. The identification of the object may be used in a variety of ways, as embodiments are not limited to operating with particular tasks or types of tasks. For example, if the user provides speech input requesting to "Navigate me to that building" and the task facility determines, through the process 420, the identity of "that building," then the task facility may next obtain and output for the user navigation instructions to bring the user to that building. As another example, if the user provides speech input requesting "What is the name of that mountain?" then the identity of the mountain (as determined in block 428) may be output, such as by displaying the name of the mountain on a display (e.g. as an AR annotation of the mountain on a windshield display) or by outputting the name as audio through speech synthesis. In other cases, a user may request to "Send the address of that building to Kevin" and the task facility may trigger transmission of an electronic message to Kevin (who may be identified from the user's contact list) that includes the address of the building that was identified in block 428. Embodiments are not limited to using the information obtained through the process 420 in any particular manner.

In various examples described above, a multimodal interface includes a gaze detection interface and a gesture recognition interface. It should be appreciated that embodiments are not limited to including both interfaces, and that in some embodiments only one of these two interfaces may be included. Other embodiments may not include either a gaze detection interface or a gesture recognition interface, as embodiments are not limited to including any particular input modalities. Though, as described above, the inventors have recognized the advantages of gaze detection and gesture recognition for a vehicle interface.

In some embodiments that include both a gaze detection interface and a gesture recognition interface, a task facility may include functionality to determine by which input modality a user is providing input that aligns with speech input received via the interface. While a user is operating a vehicle, the user may be looking around the environment to ensure safe operation of the vehicle. As such, the gaze detection interface may always, at every point in time, determine an angle of a user's gaze, but this may not correspond to input provided by the user in connection with a task. Similarly, a user may have moved a hand or limb of the user, but may not have intended to provide gesture input in accordance with a task.

Further, in some cases, a task facility may have difficulty distinguishing between two types of non-speech input that are received at a time, as a user may look in a different direction than he or she gestures.

The process 500 may be used in some embodiments to determine which input modality a user used to provide non-speech input in connection with a task described by speech input. The process 500 begins in block 502, in which the task facility determines whether gaze input was provided by the user. The task facility may determine whether gaze input was provided by the user by determining whether the gaze of the user falls outside of a region that corresponds to vehicle operation. In some embodiments, an area that is front of a driver of a vehicle and in the direction of travel of the vehicle may be considered to be an area associated with monitoring for safe operation of the vehicle and not corresponding to any task input. If the user's gaze during a time of speech input falls in that area, the user may be determined not to have provided gaze input during that time. As another example, the task facility may carry out a process like the processes of FIGS. 4A and 4B to determine, for a task, whether a user's gaze intersects a position in a portion of the windshield that is used for a display or an object in the environment. If no windshield position or object is determined, then the user may be determined not to have provided gaze input. If, however, a windshield position or object is determined, the task facility may determine that the user provided gaze input.

If the task facility determines in block 502 that the user did not provide gaze input, then in block 504 the task facility determines whether the user provided gesture input. The task facility may determine whether the user provided gesture input by determining, as a threshold matter, whether the user made any gesture at the time of the speech input. If the user did not make any gesture, then the task facility may determine that the user did not provide gesture input. The task facility may also determine whether the user provided gesture input by, similar to what was described in the preceding paragraph, analyzing a gesture made by the user using a process like those of FIGS. 4A and 4B, to determine, for a task, whether a user's gesture indicates a position in a portion of the windshield that is used for a display or an object in the environment. If no windshield position or object is determined, then the user may be determined not to have provided gesture input. If, however, a windshield position or object is determined, the task facility may determine that the user provided gesture input.

If the user is determined in block 504 to have provided gesture input, then in block 506 the task facility uses the gesture input, such as by using a windshield position or object identified based on the gesture input.

If, however, the user is determined not to have provided gesture input, then the task facility has determined that the user provided neither gaze input nor gesture input, and in block 508 prompts the user for input.

If the task facility determines in block 502 that gaze input was provided, then in block 510 the task facility determines whether gesture input was also provided. The task facility may perform the operations of block 510 in the manner described in connection with block 504. If the facility determines that gesture input was not provided, then in block 512 the facility uses the gaze input of block 502, such as by using a windshield position or object identified based on the gaze input.

If, however, the facility determines in block 510 that gesture input was provided, then the facility has determined that both gesture input and gaze input was provided. This has the potential to create an ambiguity as to the user's input. In block 514, the task facility determines whether the inputs are consistent. The facility may determine whether the inputs are consistent, for example, by determining whether they refer to the same windshield position (or positions within a threshold proximity) or the same object in the environment. This may occur, for example, if a user looks in the direction he or she gestures, when providing non-speech input. If so, then in block 516 the facility uses the windshield position or object indicated by both inputs.

If, however, the task facility determines in block 514 that the inputs are not consistent, then the task facility in block 518 prompts the user to provide input identifying a position or object. The prompt in block 518 may include a message indicating that the gaze input of the user was inconsistent with the gesture input, and reminding the user to provide only one input or provide consistent inputs.

Once the user is prompted in blocks 508, 518, or inputs are used in 506, 512,516, the process 500 ends.

In examples described above, a task facility of a multimodal interface determines non-speech input, such as geometric input, that corresponds to an ambiguity in the speech input and relates to a task to be performed. In some embodiments, to determine non-speech input, a task facility may constrain its analysis of input detected by a non-speech modality. One such way in which the task facility may constrain its analysis is to constrain analysis in time. A gaze detection facility may, for example, track eye position for a driver over an entirety of a time that the driver is operating a vehicle. The driver's eyes may be detected to be at various positions throughout the time that speech input is being provided by the driver, but not all of those positions may correspond to the speech input or the task the user desires to be performed. Indeed, some of the eye positions may correspond to monitoring a path of travel of the vehicle, to ensure safe operation of the vehicle. Accordingly, to ensure that the non-speech input that is detected by the task facility is the input that was intended by a user who provided speech input, the task facility may constrain its analysis of non-speech input to one or more particular times, or otherwise constrain the analysis in time.

Figure 6A:
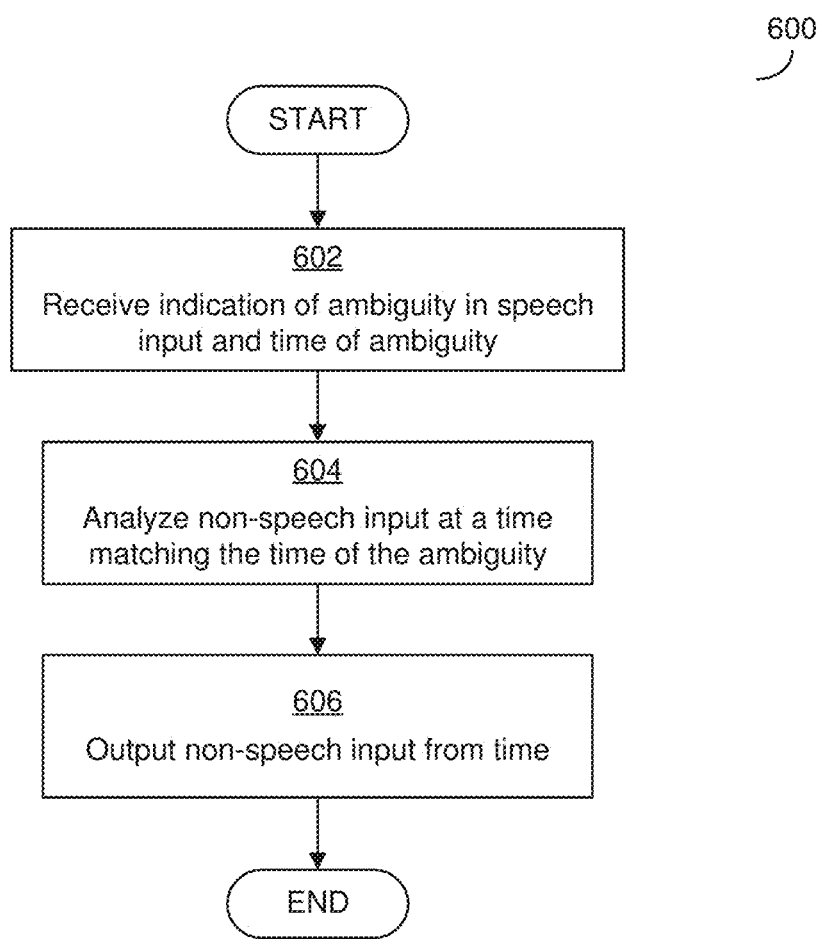
FIGS. 6A and 6B are flowcharts for processes that may be implemented in some embodiments to identify non-speech input that corresponds to ambiguities included in speech input.
Figure 6B:
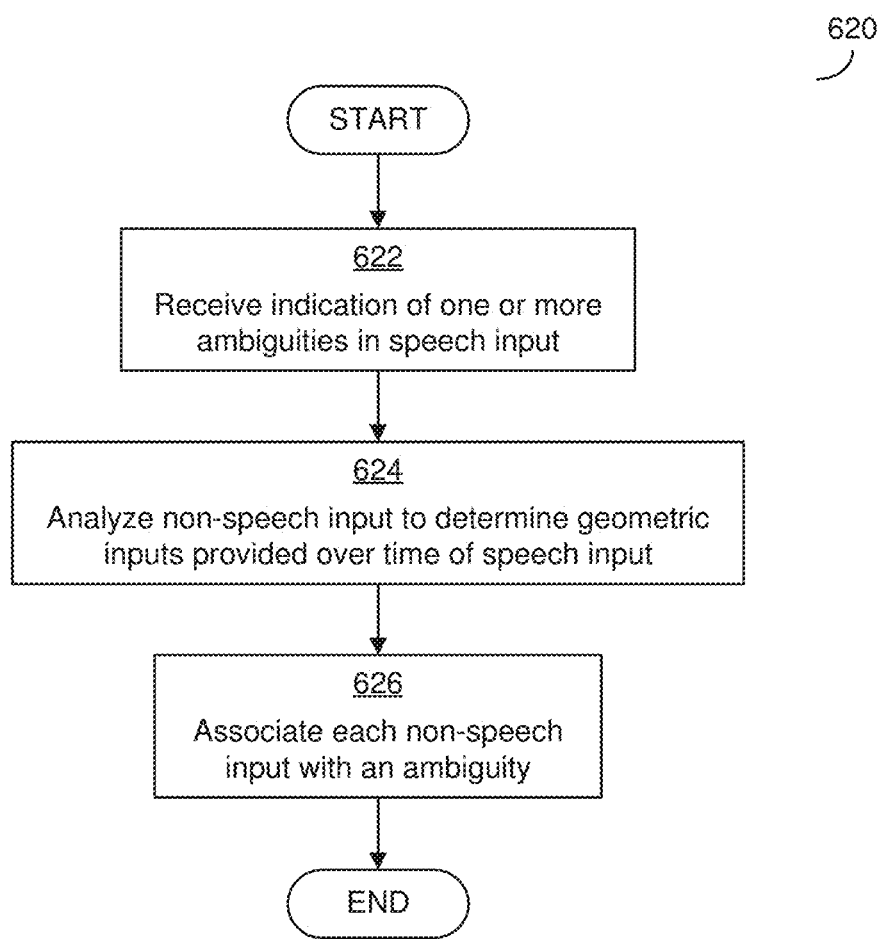
Figure 7:
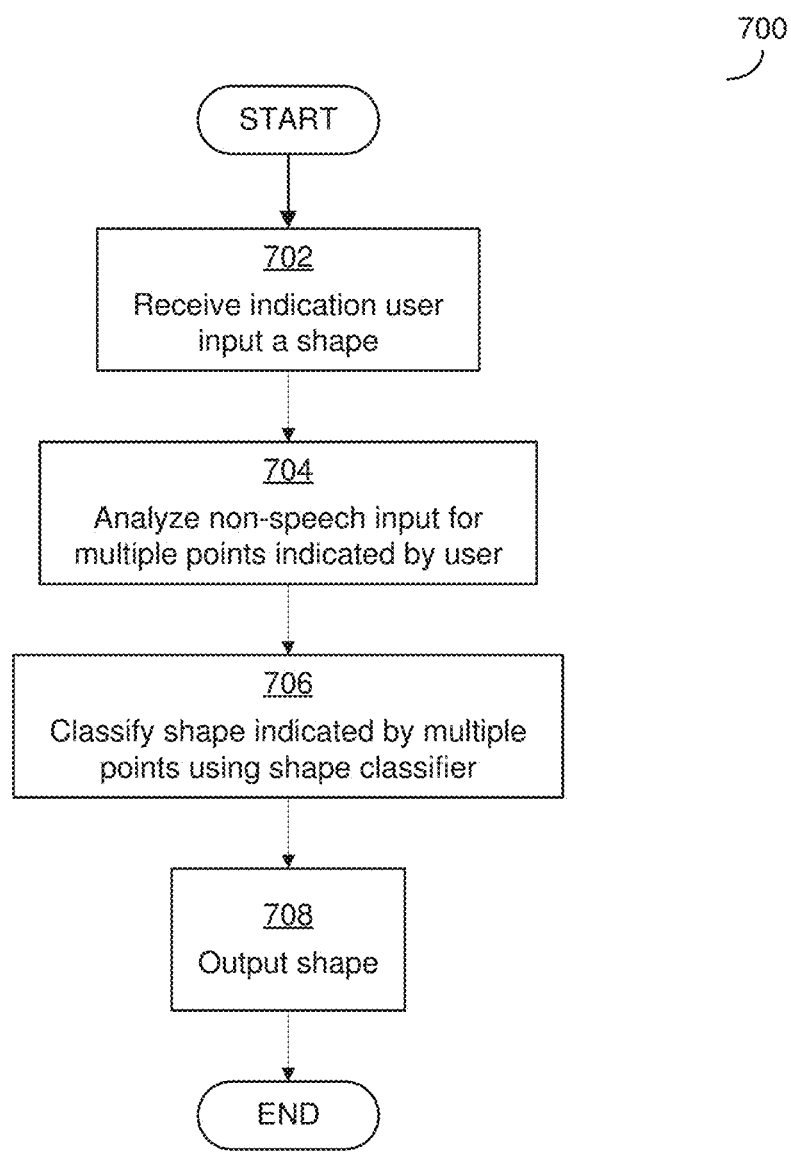
FIG. 7 is a flowchart of a process that may be implemented in some embodiments to receive non-speech input from a user of multiple positions, such as to indicate a shape.

FIGS. 6A and 6B illustrate two examples of ways in which a task facility may analyze non-speech input to determine input that aligns with speech input provided by a user. In the example of FIG. 6A, when the speech input is analyzed (e.g., by a natural language processor) and an ambiguity that relates to a task is detected in the speech input, the natural language processor may output an identification of the term that is ambiguous as well as a time at which the user spoke the word or phrase corresponding to the ambiguity. For example, for the speech input "Move the navigation display here," the term "here" is the ambiguity relating to the task that may be resolved using non-speech input. The natural language processor may output an identification of the ambiguity related to the term "here" as well as an identification of a time at which the user spoke the term. The time at which the user spoke the term may be a range of time, starting from a time the user spoke the first sound of "here" (the "h") through to the time the user spoke the last sound of "here." The time at which the user spoke the term may alternatively be a specific point in time, such as a time the first sound was spoken, a mid-point of the time over which the word was spoken, or a time the last sound was spoken, or another time.

The process 600 starts in block 602, in which the task facility receives that indication of ambiguity in speech input (e.g., the term "here") and a time associated with that ambiguity. The time received in block 602 may be a precise time or a time range. In block 604, the task facility analyzes non-speech input received via one or more non-speech input modalities at times matching the time indicated in block 602. The times matching the time indicated in block 602 may be at the exact time indicated in block 602, or may be the time indicated in block 602 plus a threshold amount of time before and/or after the time of block 602. The threshold amount of time may allow for some variation in the user's actions as the user provides the speech input and the non-speech input, potentially while also driving an automobile. From the analysis of block 604, the task facility may receive from a gaze detection interface or gesture recognition interface, or other interface, geometric input or other input provided by the user at the times matching the time. This may be, for example, an angle in which a user was looking at the times.

In block 606, the task facility outputs the non-speech input from the times.

While, for ease of description, FIG. 6A was discussed with respect to a single ambiguity, it should be appreciated that the process of FIG. 6A may be repeated for each of multiple ambiguities that may be included in speech input. For example, for the speech input "Move that element there," the process of FIG. 6A may be used twice, to determine non-speech input related to "that element" and non-speech input related to "there."

In some embodiments, the natural language processor may not output a specific time associated with each ambiguity included in speech input. As such, the task facility may not be able to determine a precise time at which to analyze non-speech input that may correspond to the speech input. In some such embodiments, the process of FIG. 6B may be used.

The process 620 of FIG. 6B begins in block 622, in which the task facility receives an indication of one or more ambiguities included in speech input. The task facility may not receive a timestamp for each ambiguity (as in connection with FIG. 6A), but may receive an indication of a time over which the speech input was received. The task facility, in response, in block 624 analyzes non-speech input to determine a number of non-speech inputs, such as a number of geometric inputs, provided by the user over the time of the speech input. For example, the task facility may operate the gaze detection interface to determine a number of locations, during the time the user was speaking the speech input, a number of times the user's gaze paused and the angle in which the user was looking at each such pause. These pauses may be associated with the non-speech input the user was provided, and relate to the ambiguities in the speech input. As another example, the task facility may operate the gesture recognition interface to determine a number of gestures input by the user during the time the user was speaking the speech input, as each such gesture may be associated with an ambiguity in the speech input. In block 626, the task facility aligns the time-ordered set of ambiguities identified in block 622 with the time-ordered set of non-speech inputs identified in block 624, such that the first ambiguity is associated with the first non-speech input, the second with the second, and so on. Once the inputs are associated with the ambiguities in block 626, the process 620 ends.

As discussed above, in some embodiments, a user may provide geometric input that includes multiple points. This may be the case, for example, where the user is providing input of a shape, such as a shape of a user interface element that the user would like displayed in a display. The process 700 of FIG. 7 may be used to provide such an input.

The process 700 begins in block 702, in which a task facility receives an indication that a user is to provide non-speech input that includes multiple points, such as a shape. This may be based on a determination that speech input includes a reference to a "shape" or a "form" (e.g., "Display navigation info in this shape"). In block 704, the task facility analyzes non-speech input (e.g., gaze input, gesture input, etc.) to determine multiple points indicated by the user. The multiple points may be a continuous track of points, such as a case in which a user "draws" an entire shape with a sweep of a gaze or gesture. The multiple points may alternatively be a set of discrete points for a shape, such as points for each corner or vertex of a shape or points for corners/vertices and multiple other points along lines of the shape.

In other cases, the user may not provide input that defines an entirety of a shape, but may input only limited points that are indicative of the shape. For example, the user may define a rectangle or square by inputting points for two diagonal corners of the shape (e.g., top-left and bottom-right). Or may input a circle by identifying two opposite points of the circle. In such cases, the speech input may define the shape to be drawn (e.g., "Display navigation info in this circle").

In some embodiments, once the user has provided input of multiple points, the task facility may classify the shape indicated by the multiple points using a shape classifier. The shape classifier may be trained to recognize regular geometric shapes (e.g., squares, rectangles, circles, etc.) from imperfect input provided by users. In this manner, the task facility may be able to configure a user interface to display information within a crisp rectangle even in a case that a user provides input that is similar to, but not quite a rectangle. This may reduce a burden on the user to provide precise input, making the multimodal interface easier to manipulate. It should be appreciated, however, that embodiments are not limited to implementing a shape classifier, and that some embodiments may display information within a shape of any form drawn by a user.

In block 708, once the task facility has identified the shape using the shape classifier or from the multiple points determined in block 704, the task facility outputs the shape for use in the task to be performed by the task facility in accordance with the user input. The process 700 then ends.

Figure 8:
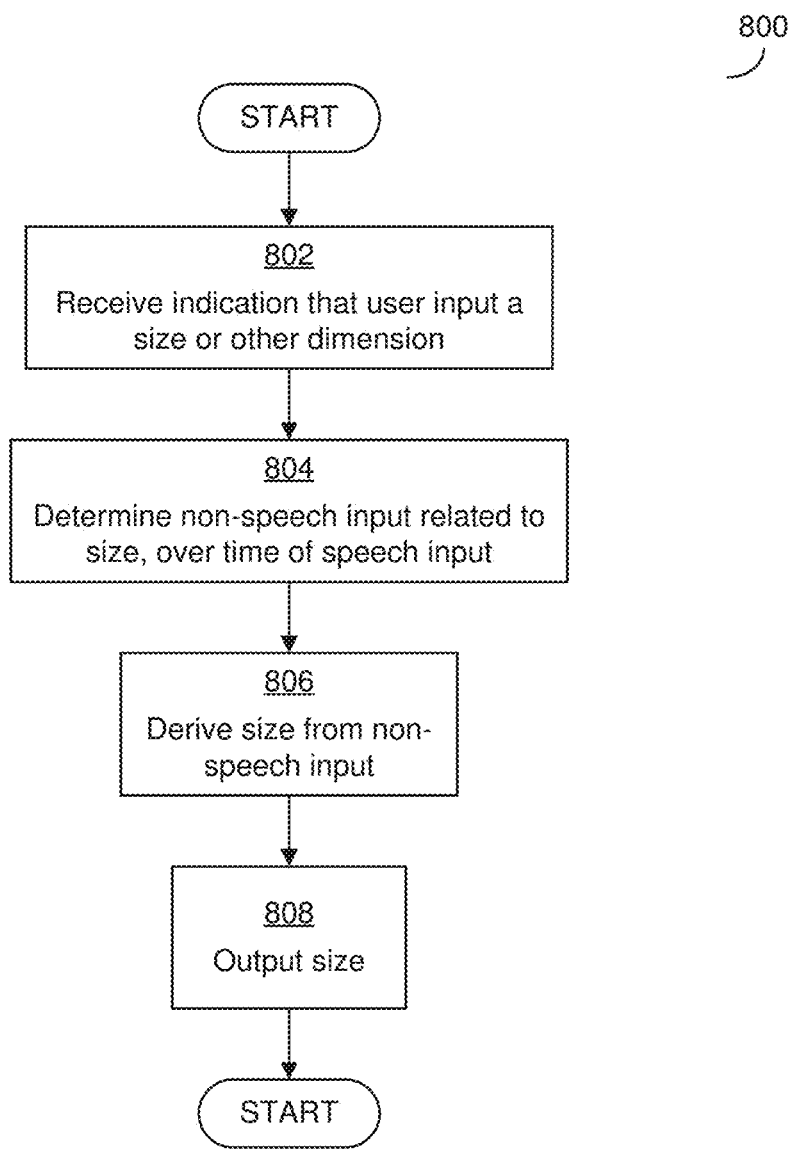
FIG. 8 is a flowchart of a process that may be implemented in some embodiments to receive non-speech input from a user of a size or other dimension.

In some embodiments, a user may be able to input geometric input to a multimodal interface that includes size information or other dimension information. For example, if a user requests resizing of a user interface element, the user may input a size via non-speech input. The user may input the size in any of a variety of ways. FIG. 8 illustrates an example of one process that may be used in some embodiments to receive input of a size or other dimension through gesture input.

The process 800 begins in block 802, in which a task facility receives an indication that the user input a size or other dimension. The indication may have been determined from speech input, such as by natural language processing (e.g., of speech input such as "Make that element this much bigger"). In block 804, the task facility operates a gesture recognition interface of the multimodal interface to determine a gesture related to the size desired by the user. The gesture may include a movement of a finger, hand, arm, or other appendage from one location to another, over the time of the speech input. In block 806, the task facility derives the size from the detected gesture. To do so, the task facility takes the start and end position of the gesture as two sets of 3D coordinates (x, y, z). The task facility calculates the magnitude of a vector between the two coordinates using the following equation:

$$\sqrt{(x_2-x_1)^2+(y_2-y_1)^2+(z_2-z_1)^2}$$

where the first coordinate is $(x_1, y_1, z_1)$ and the second coordinate is $x_2, y_2, z_2)$. The task facility will then output the size in block 808, and manipulate the user interface element and update the display in accordance with the determined size (e.g., by shrinking or enlarging an element, per the user's request). The process 800 then ends.

Figure 9:
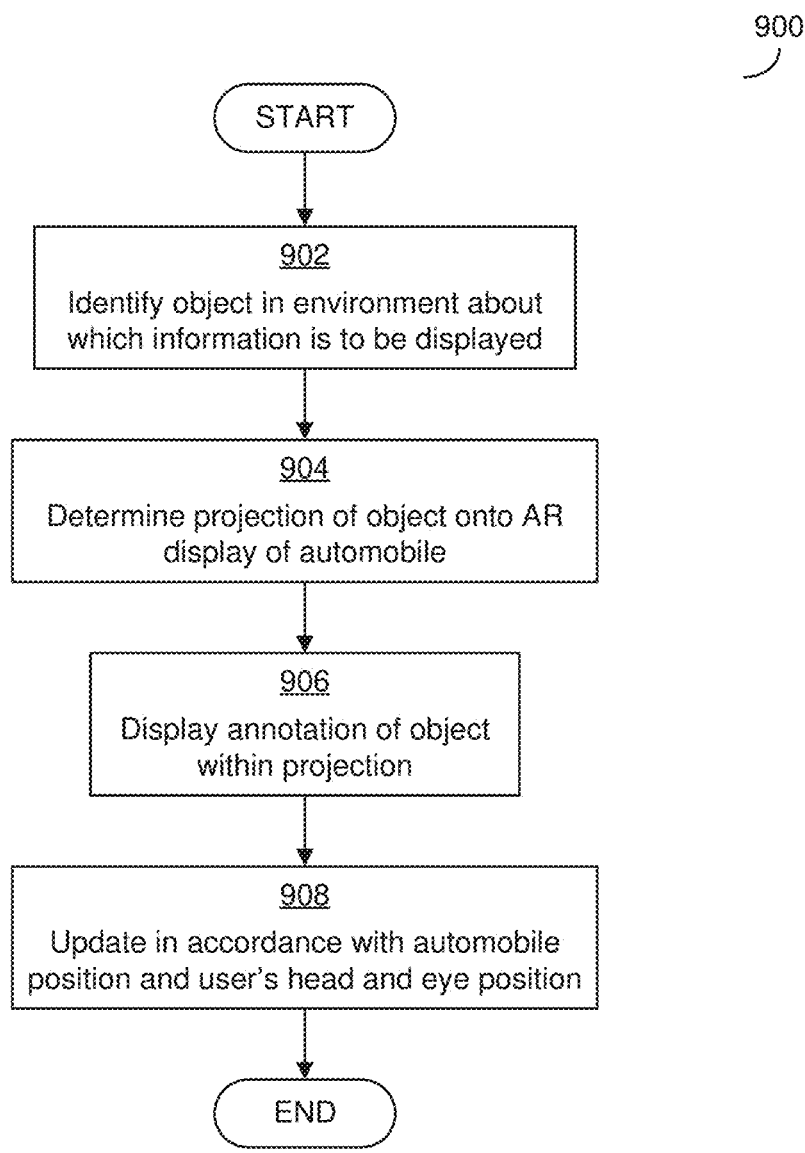
FIG. 9 is a flowchart of a process that may be implemented in some embodiments to generate an Augmented Reality (AR) display for a multimodal interface.

As discussed in various examples above, in some embodiments a display of a multimodal interface may include information regarding objects in an environment in which an automobile is traveling, such as in response to a user request for the information or in response to any other suitable condition. In some embodiments, the information regarding an object in the environment may be displayed in a windshield display of an automobile (e.g., as in FIG. 1) such that the information is shown superimposed on or otherwise associated with the object in the field of view of the driver, so as to provide an "Augmented Reality" user interface. FIG. 9 illustrates an example of a process that may be used to provide such an AR display.

The example process 900 of FIG. 9 makes use of two 3D models described above, the 3D model of the environment and the 3D model of the automobile. The process 900 begins in block 902, in which the task facility identifies an object in the environment about which information is to be displayed. The facility may identify the object in block 902 using techniques described herein, including in connection with FIG. 413.

In block 904, the task facility determines a projection of the object onto the AR display of the automobile. The projection of the object is the position in the display at which the light from the object passes through the display, such as by passing through the windshield of the automobile when the AR display is integrated with the windshield. The projection of the object on the AR display depends on a variety of factors, including the position from which the user is looking at the display (e.g., the user's head and eye position) and the position of the automobile with respect to the object.

To determine the projection, the task facility determines the eight corners of a 3D element (e.g., a rectangular prism) corresponding to the object in the 3D model of the environment, and identifies a ray extending from each corner toward a point between the two eyes of the user. The facility then determines, based on the 3D model of the automobile, eight points at which those eight rays would intersect with the windshield of the automobile. The task facility identifies a rectangle that includes all eight of these points. This rectangle is the projection of the object on the AR display.

In some embodiments, rather than only determining the eight corners of the 3D prism in the model of the environment, the task facility may determine a portion of the 3D prism that is visible to the driver, based on the current position of the automobile and/or the user's head/eyes. This may include determining other objects that may partially obstruct the object of the driver's interest, including other buildings and/or other vehicles in the environment. For example, based on the :11) model of the environment, the task facility may determine one or more other objects in the environment that may partially obstruct a view of the desired object. As another example, based on geographic GPS) positions obtained regarding other vehicles in the environment, the task facility may identify other vehicles that may partially obstruct a view of the desired object. Based on 3D models of the partial obstructions (e.g., rectangular prisms for other objects in the environment, rectangular prisms for other vehicles), the task facility may determine a portion of the desired object that is in view of the user at a time. From this, the task facility may identify eight corners of the portion that is in view, and determine a projection as above based on those eight corners.

Accordingly, in block 906 the task facility displays content regarding the object, such as an annotation of the object, within the projection or a portion of the projection. Because the correctness of the annotation depends on proper positioning of the projection, in block 908 the task facility updates the projection and updates the annotation in accordance with changing automobile position and changing head/eye position of the user, as well as, in some embodiments, based on changing positions of other vehicles in the environment. In some embodiments, the task facility may recalculate the projection multiple times per second. The projection may be continuously updated until the object is no longer in view (e.g., the automobile drove past it) or a user requests that the information no longer be displayed.

Various examples described above include techniques to allow for multimodal input of information describing a task a user would like to be performed. As discussed above, embodiments are not limited to operating with any particular task or form of speech or non-speech input. Provided below are illustrative examples of tasks and inputs with which some embodiments may operate:

Example 1: A user requests, through speech input, that multimodal interface display news headlines. Upon analysis of the speech input, the task facility determines that the user did not specify a position and prompts the user for further input, with speech synthesis. The user in response says "Place it here" and provide gaze input indicating a particular position on the windshield display. The task facility may also determine that the user has not specified the shape in Which the user would like the news headlines displayed and prompts the user, with speech synthesis, to "Draw the form that you like." In response, the user "draws" a rectangle on the windshield by outlining the shape with a sweep of a pointer finger toward the windshield. The task facility updates the display to show news headlines at the indicated position and within the indicated rectangle.

Example 2: A user requests, through speech input, that music player information be displayed on the screen. Upon analysis of the speech input, the task facility determines that the user did not specify a position and prompts the user, with speech synthesis, for the desired position. The user provides additional speech input to "place it here in this form" and during this speech input draws a form (e.g., a circle) at a particular position in the display. The music player is then displayed on the display in the form drawn by the user. Subsequently, the user asks to resize that form, such as by speaking the speech input "Make the music player larger." The task facility, upon analysis of this new speech input, may determine that the user has not indicated how much smaller to show the music player and may prompt the user, using speech synthesis, to input an amount. In response, the user may move her hand diagonally upward. As the user's hand moves, the task facility monitors the movement and enlarges the music player in accordance with the rising hand. When the form reaches the user's desired size, the user says "Stop, that's good," at which point the task facility stops enlarging the form.

Example 3: in Example 1 above, the user was prompted for a shape and drew a free-form shape in Which the requested information is displayed. In this example, the user inputs a free-form shape which is analyzed using a shape classifier to identify, from the free-form shape, a regular geometric shape that the user was drawing.

Example 4: In Example 1 above, the user uses gaze input to specify a position at which new content is to be displayed. In this example, rather than gaze input, the user may input a gesture, such as by pointing at the desired position.

Example 5: A user may desire to rearrange user interface elements in a display, such as by speaking the command "Move that element to here." In response, the task facility determines time stamps associated with two different portions of the input: "move that element" and "to here." The task facility will then analyze gaze input during each time. The facility may thus determines that the user interface element that had the highest number of "collisions" (see discussion of FIG. 4A) between a line following the user's gaze to the element, over the time of the first portion of the input, to be the element to which the user is referring. The facility may then determine a position on the windshield at which a user was looking during speaking the phrase "to here," as described in FIGS. 4A and 6A. The task facility may then move the identified user interface element to the new position.

Example 6: in Example 5, the user provides input using gaze. In this example, rather than gaze input, the user may input a gesture, such as by pointing at the element and at the new desired position.

Example 7: The user may desire information on an object (e.g., a landmark) in an environment through which the automobile is passing, and may provide the speech input "Tell me more about that." The task facility may determine the object referenced by "that" by identifying an object in the environment at which the user is looking or gesturing, and may display information about the object in an AR interface.

Example 8: A user may desire to transmit an electronic message to another person that includes information about an object of an environment, such as an address of the building. The user may provide speech input to "Send the address of that building to Kevin." The task facility may identify Kevin and obtain his contact information from the user's contact list. The facility may also determine, from a gaze or gesture of the user at a time the user spoke that speech input (or the portion of the speech input corresponding to "that building"), the building to which the user is referring and obtain address information for the building. The facility may then trigger transmission of an electronic message to "Kevin" that includes the address information.

Example 9: The user may desire to send a location within an environment to a contact person, such as by providing the speech input "Send that point to Kevin." The task facility may identify Kevin and obtain his contact information from the user's contact list. The facility may also determine, from a gaze or gesture of the user at a time the user spoke that speech input (or the portion of the speech input corresponding to "that point"), the point to which the user is referring and obtain address information for the point. In some embodiments, it may be difficult to precisely identify a position referenced by a user with gaze input, because the user may be looking around the environment at all times to ensure safe operation of the automobile. Accordingly, in some embodiments the gaze of the user over the duration of the speech input is obtained. The three-dimensional coordinates for where the user's gaze was with respect to the environment may be averaged to determine a single coordinate. The facility may then trigger transmission of an electronic message to "Kevin" that includes the position in the environment of that coordinate.

Example 10: The user may desire to customize the display of user interface elements in a display of the multimodal user interface. The user could speak the command "Make that one yellow" and provide gaze or gesture input indicating a user interface element. Consistent with examples above, the task facility may determine a position on the windshield corresponding to "that one," and identify a user interface element at that position. The task facility may then update the display such that the identified user interface element is shown in yellow.

Accordingly, it should be appreciated that various forms of tasks may be performed in embodiments, and that embodiments are not limited to particular forms of input or tasks.

In some embodiments, the multimodal interface described herein may not be used to define a task that a user would like performed during operation of a vehicle. Rather, components of the multimodal interface may be used to monitor a driver or other user of the vehicle over a time that the driver/user is in the vehicle and generate information on behavior of the driver/user during the time. For example, a task facility may store over time information indicating objects in the environment at which the driver/user looked during operation of the vehicle, such as between a time the vehicle's ignition was turned on and a time when the vehicle's ignition was turned off. Subsequently, the user may request information regarding where the user looked over time. Such information may be a "heat map" showing objects in the environment at which a user looked more or less often during the time.

Figure 10:
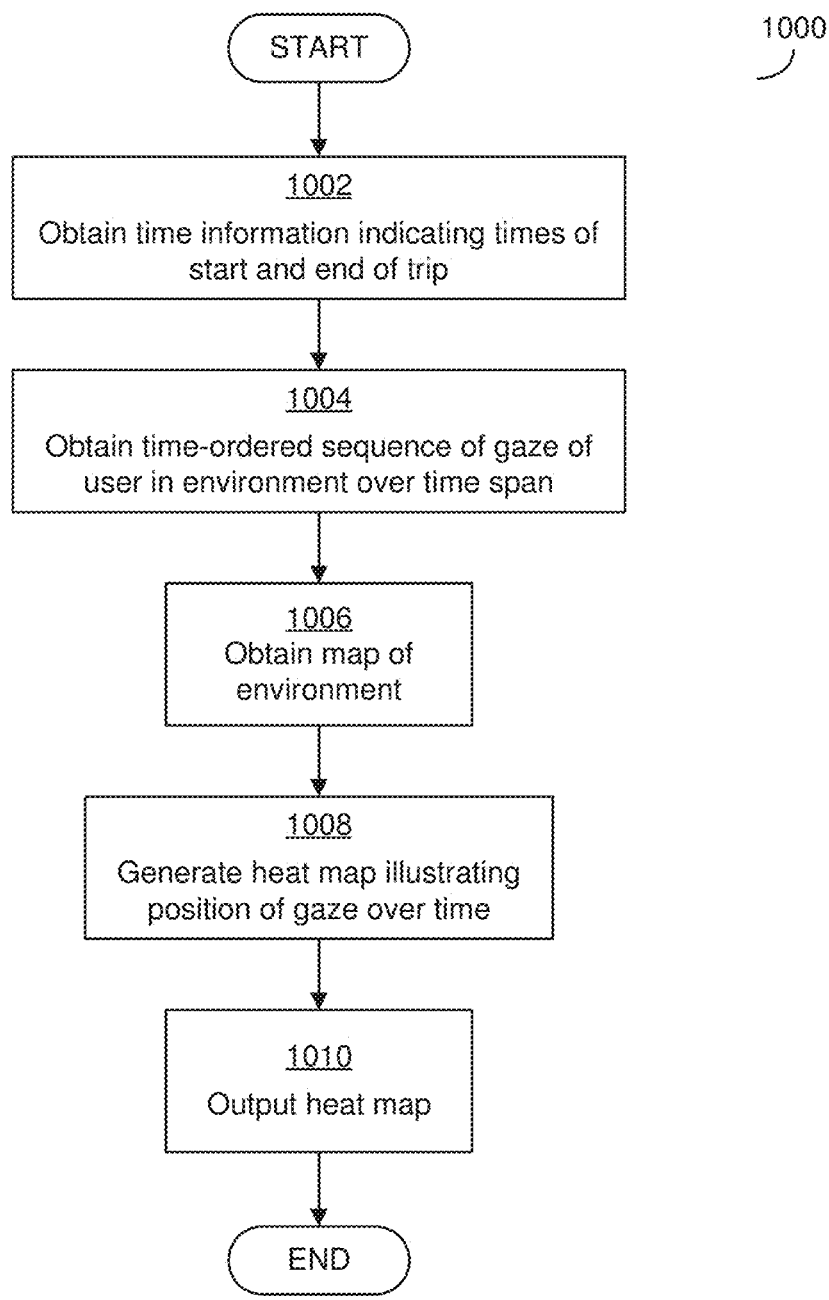
FIG. 10 is a flowchart of a process that may be implemented in some embodiments to generate a heat map of gaze positions of a driver during the course of operation of a vehicle.

FIG. 10 illustrates an example of a process that may be used by a task facility in some embodiments to generate a heat map of a user's gaze over time. The process 1000 of FIG. 10 begins in block 1002, in which the task facility obtains time information indicating a start and end of a trip of a vehicle. The start and end times may be defined, for example, by times at which the ignition of the vehicle was turned on and off. The start and end times may additionally or alternatively be defined by times at which the vehicle was not moving for more than a threshold period of time (e.g., two minutes, five minutes, 30 minutes, one hour, etc.), indicating that operation of the vehicle may have ceased. Other ways may be used to determine start and end times of a trip, as embodiments are not limited in this respect.

Next, in block 1004, the task facility obtains from a gaze detection interface a time-ordered sequence of gaze positions detected for the driver between the start and end times. The gaze detection interface may detect a gaze position of a driver throughout operation of the vehicle, such as multiple times per second. The gaze detection facility may do this for a number of reasons apart from operation of the multimodal interface described herein, including as part of a driver monitoring system to analyze for and warn of driver distraction or weariness. Accordingly, the gaze detection interface may store, for the time between the start and end times of the trip, a time-ordered sequence of gaze positions that the task facility may obtain in block 1004.

In block 1006, the task facility obtains a map of the environment in which the vehicle was operated over the time. This may be a 3D) map of the environment, such as a 3D model of the environment described in examples above. This may alternatively be a two-dimensional map of the environment. The map may be obtained from any suitable data store, including from a mapping service accessible by the task facility.

In block 1008, the task facility generates a heat map based on the time-ordered sequence of gaze positions from block 1004 and the map from block 1006. The heat map may be a 2D or 3D heat map, depending on the nature of the map obtained in block 1006, and may indicate positions at which the user looked over time. In embodiments in which the map data of block 1006 is a 3D model of the environment, techniques described herein (e.g., in connection with FIG. 4B) may be used to determine the object at which a user looked for each gaze position in the time-ordered sequence and associate a gaze position with a position at which a line following the gaze position would intersect an element associated with the object in the model.

As part of generating the heat map, in some embodiments the task facility may employ a filter to remove gaze positions that are likely to be associated with viewing a path of travel of the vehicle or otherwise associated with operation of the vehicle. For example, for an automobile, the task facility may filter out gaze positions that are forward of the driver in a direction of travel of the vehicle. In other embodiments, the task facility may determine, with the model, gaze positions that would intersect with an element of the model corresponding to a street or street sign. With such a filter, the task facility may obtain a time-ordered sequence of gaze positions indicating objects of the environment that the user looked at over the course of operation of the vehicle.

As part of generating the heat map, once the task facility has associated gaze positions with locations in the map data, the task facility may also identify density of gaze position for areas of the map. The task facility may then color areas of differing density differently, to indicate the high and low density over time. This density of gaze position may indicate an amount of the driver's attention that was given to the area, such as an amount of time the driver looked at the area or a number of times the driver looked at the area.

In block 1010, the task facility outputs the heat map for presentation, either to the driver or to another user. For example, the task facility may output the heat map for display, such as via a display of the multimodal interface or another display. Or, the task facility may transmit the heat map to another computing device. After output, the process 1000 ends.

While the process 1000 of FIG. 10 was described as being carried out by the task facility of the multimodal interface, it should be appreciated that embodiments are not so limited. The heat map may be generated by other facilities in other embodiments, which may execute on computing devices remote from the automobile. For example, in some embodiments the gaze detection interface may provide (e.g., by wireless transmission from the automobile) a time-ordered sequence of gaze positions to a data store remote from the automobile and a facility on a remote computing device may perform a process like the example of FIG. 10 to generate a heat map.

It should also be appreciated that embodiments are not limited to generating the heat map for any particular reason or purpose. In some embodiments, the heat map may be generated as a measure of potential driver distraction, such as by indicating an amount of the user's attention that was drawn away from the road. For example, once generated, the heat map may be reviewed (e.g., programmatically, or manually by a human) to determine whether the heat map shows any density levels that may correspond to potential driver distraction, such as an amount of attention spent on an object in the environment that indicated that, at that time, the driver was potentially not paying sufficient attention to the operation of the vehicle.

Techniques operating according to the principles described herein may be implemented in any suitable manner. Included in the discussion above are a series of flow charts showing the steps and acts of various processes that operate a multimodal interface for an automobile. The processing and decision blocks of the flow charts above represent steps and acts that may be included in algorithms that carry out these various processes. Algorithms derived from these processes may be implemented as software integrated with and directing the operation of one or more single- or multi-purpose processors, may be implemented as functionally-equivalent circuits such as a Digital Signal Processing (DSP) circuit or an Application-Specific Integrated Circuit (ASIC), or may be implemented in any other suitable manner. It should be appreciated that the flow charts included herein do not depict the syntax or operation of any particular circuit or of any particular programming language or type of programming language. Rather, the flow charts illustrate the functional information one skilled in the art may use to fabricate circuits or to implement computer software algorithms to perform the processing of a particular apparatus carrying out the types of techniques described herein. It should also be appreciated that, unless otherwise indicated herein, the particular sequence of steps and/or acts described in each flow chart is merely illustrative of the algorithms that may be implemented and can be varied in implementations and embodiments of the principles described herein.

Accordingly, in some embodiments, the techniques described herein may be embodied in computer-executable instructions implemented as software, including as application software, system software, firmware, middleware, embedded code, or any other suitable type of computer code. Such computer-executable instructions may be written using any of a number of suitable programming languages and/or programming or scripting tools, and also may be compiled as executable machine language code or intermediate code that is executed on a framework or virtual machine.

When techniques described herein are embodied as computer-executable instructions, these computer-executable instructions may be implemented in any suitable manner, including as a number of functional facilities, each providing one or more operations to complete execution of algorithms operating according to these techniques. A "functional facility," however instantiated, is a structural component of a computer system that, when integrated with and executed by one or more computers, causes the one or more computers to perform a specific operational role. A functional facility may be a portion of or an entire software element. For example, a functional facility may be implemented as a function of a process, or as a discrete process, or as any other suitable unit of processing. If techniques described herein are implemented as multiple functional facilities, each functional facility may be implemented in its own way; all need not be implemented the same way. Additionally, these functional facilities may be executed in parallel and/or serially, as appropriate, and may pass information between one another using a shared memory on the computer(s) on which they are executing, using a message passing protocol, or in any other suitable way.

Generally, functional facilities include routines, programs, objects, components, data structures, etc. that perform particular tasks or implement particular abstract data types. Typically, the functionality of the functional facilities may be combined or distributed as desired in the systems in which they operate. In some implementations, one or more functional facilities carrying out techniques herein may together form a complete software package. These functional facilities may, in alternative embodiments, be adapted to interact with other, unrelated functional facilities and/or processes, to implement a software program application.

Some exemplary functional facilities have been described herein for carrying out one or more tasks. It should be appreciated, though, that the functional facilities and division of tasks described is merely illustrative of the type of functional facilities that may implement the exemplary techniques described herein, and that embodiments are not limited to being implemented in any specific number, division, or type of functional facilities. In some implementations, all functionality may be implemented in a single functional facility. It should also be appreciated that, in some implementations, some of the functional facilities described herein may be implemented together with or separately from others i.e., as a single unit or separate units), or some of these functional facilities may not be implemented.

Computer-executable instructions implementing the techniques described herein (when implemented as one or more functional facilities or in any other manner) may, in some embodiments, be encoded on one or more computer-readable media to provide functionality to the media. Computer-readable media include magnetic media such as a hard disk drive, optical media such as a Compact Disk (CD) or a Digital Versatile Disk (DVD), a persistent or non-persistent solid-state memory (e.g., Flash memory, Magnetic RAM, etc.), or any other suitable storage media. Such a computer-readable medium may be implemented in any suitable manner, including as computer-readable storage media 1106 of FIG. 11 described below (i.e., as a portion of a computing device 1100) or as a stand-alone, separate storage medium. As used herein, "computer-readable media" (also called "computer-readable storage media") refers to tangible storage media. Tangible storage media are non-transitory and have at least one physical, structural component. In a "computer-readable medium," as used herein, at least one physical, structural component has at least one physical property that may be altered in some way during a process of creating the medium with embedded information, a process of recording information thereon, or any other process of encoding the medium with information. For example, a magnetization state of a portion of a physical structure of a computer-readable medium may be altered during a recording process.

In some, but not all, implementations in which the techniques may be embodied as computer-executable instructions, these instructions may be executed on one or more suitable computing device(s) operating in any suitable computer system, including the exemplary computer system of FIG. 2, or one or more computing devices (or one or more processors of one or more computing devices) may be programmed to execute the computer-executable instructions. A computing device or processor may be programmed to execute instructions when the instructions are stored in a manner accessible to the computing device or processor, such as in a data store (e.g., an on-chip cache or instruction register, a computer-readable storage medium accessible via a bus, a computer-readable storage medium accessible via one or more networks and accessible by the device/processor, etc.). Functional facilities comprising these computer-executable instructions may be integrated with and direct the operation of a single multi-purpose programmable digital computing device, a coordinated system of two or more multi-purpose computing device sharing processing power and jointly carrying out the techniques described herein, a single computing device or coordinated system of computing devices (co-located or geographically distributed) dedicated to executing the techniques described herein, one or more Field-Programmable Gate Arrays (FPGAs) for carrying out the techniques described herein, or any other suitable system.

Figure 11:
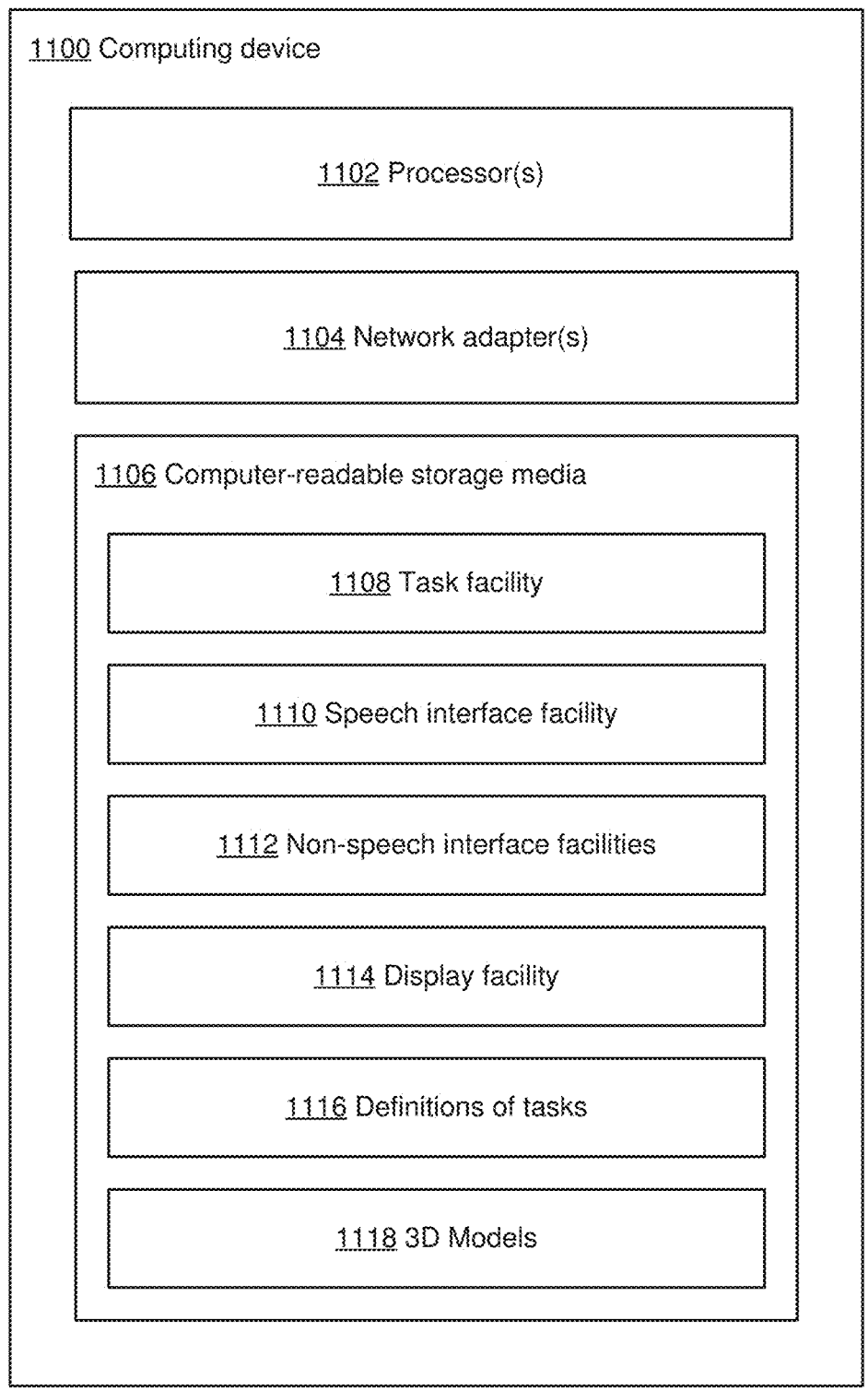
FIG. 11 is a block diagram of some exemplary component of a computing device with which some embodiments may operate.

FIG. 11 illustrates one exemplary implementation of a computing device in the form of a computing device 1100 that may be used in a system implementing techniques described herein, although others are possible. It should be appreciated that FIG, 11 is intended neither to be a depiction of necessary components for a computing device to operate in accordance with the principles described herein, nor a comprehensive depiction.

Computing device 1100 may comprise at least one processor 1102, a network adapter 1104, and computer-readable storage media 1106. Computing device 1100 may be, for example, an embedded computer of a vehicle (e.g., an automobile), a desktop or laptop personal computer, a personal digital assistant (PDA), a smart mobile phone, a server, or any other suitable computing device. Network adapter 1104 may be any suitable hardware and/or software to enable the computing device 1100 to communicate wired and/or wirelessly with any other suitable computing device over any suitable computing network. The computing network may include wireless access points, switches, routers, gateways, and/or other networking equipment as well as any suitable wired and/or wireless communication medium or media for exchanging data, between two or more computers, including the Internet. Computer-readable media 1106 may be adapted to store data to be processed and/or instructions to be executed by processor 1102. Processor 1102 enables processing of data and execution of instructions. The data and instructions may be stored on the computer-readable storage media 1106.

The data and instructions stored on computer-readable storage media 1106 may comprise computer-executable instructions implementing techniques which operate according to the principles described herein. In the example of FIG. 11, computer-readable storage media 1106 stores computer-executable instructions implementing various facilities and storing various information as described above. Computer-readable storage media 1106 may store a task facility 1108, a speech interface facility 1110, one or more non-speech interface facilities 1112 (e.g., a gaze detection facility and/or a gesture recognition facility), and a display facility 1114. The media 1106 may additionally store information to be used by one or more of such facilities, including definitions 1116 of tasks that may be performed and models 1118 of a vehicle and/or environment.

While not illustrated in FIG. 11, a computing device may additionally have one or more components and peripherals, including input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computing device may receive input information through speech recognition or in other audible format.

Embodiments have been described where the techniques are implemented in circuitry and/or computer-executable instructions. It should be appreciated that some embodiments may be in the form of a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Various aspects of the embodiments described above may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (hut for use of the ordinal term) to distinguish the claim elements.

Also, the phraseology and terminology used herein is for the purpose of description and should not he regarded as limiting. The use of "including," "comprising," "having," "containing," "involving," and variations thereof herein, is meant to encompass the items listed thereafter and equivalents thereof as well as additional items.

The word "exemplary" is used herein to mean serving as an example, instance, or illustration. Any embodiment, implementation, process, feature, etc. described herein as exemplary should therefore be understood to he an illustrative example and should not be understood to be a preferred or advantageous example unless otherwise indicated.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the principles described herein. Accordingly, the foregoing description and drawings are by way of example only.

What is claimed is:

1. A method of operating a multimodal user interface for an automobile, the multimodal interface including first and second modalities, both of which are input modalities, the first modality being a speech interface, the method comprising:
   based on the speech input received from a user through the speech interface of the multimodal user interface, determining a task, performance of which the user has requested, the task including display of information on the automobile's windshield;
   based on the speech input, determining that non-speech input has been provided by the user using the second modality,
   based on the non-speech input, determining a geometric parameter that is to be used in performing the task, and;
   using both the speech input and the non-speech input, updating display of information on the automobile's windshield in accordance with the task.

2. The method of claim 1, wherein determining the geometric parameter comprises determining a position based at least in part on an angle indicated by input received from the user via the second modality, the position being a position to which the user has referred.

3. The method of claim 2, wherein the second modality comprises a gaze detection interface for detecting the user's gaze angle and wherein determining the position based at least in part on the angle comprises determining the position based at least in part on the user's gaze angle.

4. The method of claim 2, wherein the second modality comprises a gesture-recognition interface, wherein the input received from the user via the second modality comprises a gesture made by the user, and wherein the angle indicated by the input is a gesture angle, the gesture angle being an angle of the gesture made by the user as detected using the gesture-recognition interface, and wherein determining the position based at least in part on the angle comprises determining the position based at least in part on the gesture angle.

5. The method of claim 2, wherein determining the position based at least in part on the angle comprises determining, using a model, a point in the model at which a line following the angle would intersect an object in the model and determining the position in accordance with the point in the model at which the line would intersect the object.

6. The method of claim 5, wherein the model is a three-dimensional model of the automobile, wherein the object in the model is the automobile's windshield, and wherein the point in the model at which the line would intersect the object is a point on the windshield.

7. The method of claim 5, wherein the model is a three-dimensional model of an environment in which the automobile is traveling at a time corresponding to at least a part of the speech input, wherein the object in the model corresponds to an object in the environment, and wherein the point in the model at which the line would intersect the object corresponds to a point on the object in the environment.

8. The method of claim 2, wherein, determining the position based at least in part on the angle comprises determining a windshield position on the windshield of the automobile based on an intersection with the windshield of a line following the angle and updating display of information on the windshield of the automobile comprises updating display of information at the windshield position.

9. The method of claim 8, wherein updating display of information at the windshield position comprises moving a display of information in the multimodal user interface from a prior position on the windshield to the windshield position determined from the angle.

10. The method of claim 8, wherein: the task relating to display of information on the windshield is a request to display, on the windshield, requested information that was not displayed on the windshield at the time the speech input was provided by the user and wherein updating display of information at the windshield position comprises displaying the requested information on the windshield at the windshield position.

11. The method of claim 10, wherein: determining geometric parameter related to the task from the second modality of the multimodal user interface comprises determining an outline of a shape indicated by the user via the second modality input modality, the outline of the shape comprising a plurality of positions indicated by the user with input provided via the second modality, and wherein displaying the requested information on the windshield at the windshield position comprises displaying the requested information, on the windshield, in a user interface element having the shape.

12. The method of claim 2, wherein: the task further relates to obtaining information regarding an object in an environment of the automobile, wherein determining the position based at least in part on the angle comprises determining an environment position in the environment of the automobile based on an intersection with the environment of a line following the angle at a time, wherein the method further comprises identifying the object in the environment based at least in part on the environment position and wherein updating display of information on the automobile's windshield further comprises displaying, on the windshield, information regarding the object in the environment.

13. The method of claim 12, wherein determining the environment position in the environment of the automobile comprises determining the environment position based at least in part on a geographical position of the automobile in the environment and based at least in part on an intersection with the environment of a line following the angle at the time.

14. The method of claim 1, wherein determining the task comprises performing speech recognition on the speech input.

15. The method of claim 1, wherein determining the task comprises identifying, based at least in part on a result of having performed one of eech recognition and natural language processing on the speech input, what information the user is referencing in the speech input and to which the task relates.

16. The method of claim 1, wherein the windshield comprises a partially reflective layer and wherein updating display of information on the windshield comprises projecting updated information on the windshield.

17. The method of claim 1, wherein determining the task comprises performing natural language processing on the speech input.

18. The method of claim 1, wherein updating the display comprises determining a geometric position on the windshield at which the information is displayed.

19. A manufacture comprising tangible and non-transitory computer-readable medium having encoded thereon instructions that cause a data-processing system of an automobile to operate operating a multimodal user interface of that automobile, the multimodal interface including first and second modalities, both of which are input modalities, the first modality being a speech interface, wherein the instructions, when executed by the data-processing system, cause the data-processing system to carry out the steps of, based on the speech input received from a user through the speech interface of the multimodal user interface, determining a task, performance of which the user has requested, the task including display of information on the automobile's windshield, based on the speech input, determining that non-speech input has been provided by the user using the second modality, based on the non-speech input, determining a geometric parameter that is to be used in performing the task, using both the speech input and the non-speech input, and updating display of information on the automobile's windshield in accordance with the task.

20. An apparatus comprising a processor and a tangible and non-transitory computer-readable medium having encoded thereon instructions that cause a data-processing system of an automobile to operate operating a multimodal user interface of that automobile, the multimodal interface including first and second modalities, both of which are input modalities, the first modality being a speech interface, wherein the instructions, when executed by the data-processing system, cause the data-processing system to carry out the steps of, based on the speech input received from a user through the speech interface of the multimodal user interface, determining a task, performance of which the user has requested, the task including display of information on the automobile's windshield, based on the speech input, determining that non-speech input has been provided by the user using the second modality, based on the non-speech input, determining a geometric parameter that is to be used in performing the task, -using both the speech input and the non-speech input, and updating display of information on the automobile's windshield in accordance with the task.

* * * * *